United States Patent
Kwak et al.

(10) Patent No.: US 11,930,513 B2
(45) Date of Patent: Mar. 12, 2024

(54) RESOURCE SELECTION METHOD OF SIDELINK TERMINAL IN WIRELESS COMMUNICATION SYSTEM, AND TERMINAL USING METHOD

(71) Applicant: LG Electronics Inc., Seoul (KR)

(72) Inventors: Kyuhwan Kwak, Seoul (KR); Seungmin Lee, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 395 days.

(21) Appl. No.: 17/286,955

(22) PCT Filed: Oct. 21, 2019

(86) PCT No.: PCT/KR2019/013807
§ 371 (c)(1),
(2) Date: Apr. 20, 2021

(87) PCT Pub. No.: WO2020/085732
PCT Pub. Date: Apr. 30, 2020

(65) Prior Publication Data
US 2021/0385808 A1    Dec. 9, 2021

Related U.S. Application Data

(60) Provisional application No. 62/750,712, filed on Oct. 25, 2018.

(51) Int. Cl.
*H04W 72/51*    (2023.01)
*H04L 1/08*    (2006.01)
(Continued)

(52) U.S. Cl.
CPC .............. *H04W 72/51* (2023.01); *H04L 1/08* (2013.01); *H04L 1/1812* (2013.01); *H04W 28/26* (2013.01)

(58) Field of Classification Search
CPC ........ H04W 72/51; H04W 28/26; H04L 1/08; H04L 1/1812
See application file for complete search history.

(56) References Cited

U.S. PATENT DOCUMENTS

2016/0212663 A1   7/2016  Uemura et al.
2021/0360549 A1*  11/2021 Lee .................... H04W 56/006

FOREIGN PATENT DOCUMENTS

KR    1020170138458    12/2017
WO    WO2017176098     10/2017

OTHER PUBLICATIONS

Fujitsu, "Considerations on unicast, groupcast and broadcast for NR V2X," R1-1810589, 3GPP TSG RAN WG1 Meeting #94bis, Chengdu, China, dated Oct. 8-12, 2018, 7 pages.
(Continued)

*Primary Examiner* — Ronald B Abelson
(74) *Attorney, Agent, or Firm* — Fish & Richardson P.C.

(57) ABSTRACT

A resource selection method of a sidelink terminal in a wireless communication system is presented. The method determines resource selection sub windows in a resource selection window on the basis of a repetitive transmission frequency for a sidelink message, and selects a resource for the transmission of the sidelink message in each of the resource selection sub windows, wherein the repetitive transmission frequency includes initial transmission and retransmission frequency for the sidelink message.

18 Claims, 20 Drawing Sheets

(51) Int. Cl.
H04L 1/1812 (2023.01)
H04W 28/26 (2009.01)

(56) References Cited

OTHER PUBLICATIONS

Qualcomm Incorporated, "Correct introduction of multiple HARQ processes for NB-IoT," R2-1803789, 3GPP TSG-RAN WG2 Meeting #101, Athens, Greece, dated Feb. 26-Mar. 2, 2018, 8 pages.

* cited by examiner (a)

(b)

RESOURCE SELECTION METHOD OF SIDELINK TERMINAL IN WIRELESS COMMUNICATION SYSTEM, AND TERMINAL USING METHOD

CROSS-REFERENCE TO RELATED APPLICATIONS

This application is a National Stage application under 35 U.S.C. § 371 of International Application No. PCT/KR2019/013807, filed on Oct. 21, 2019, which claims the benefit of U.S Provisional Application No. 62/750,712, filed on Oct. 25, 2018. The disclosures of the prior applications are incorporated by reference in their entirety.

BACKGROUND OF THE DISCLOSURE

Field of the Disclosure

The present disclosure relates to wireless communication, and more particularly, to a resource selecting method of a sidelink terminal in a wireless communication system and a terminal using the method.

Related Art

Interest has recently been growing in the Device-to-Device (D2D) technology, wherein direct communication is carried out between devices. Most particularly, D2D is drawing attention as the communication technology for public safety network. Although the commercial communication network is quickly shifting to LTE, due to the problem of collision with the legacy communication standard and the issue of cost, the current public safety network is still mostly based on the 2G technology. Such gap between the communication technologies and demand for more enhanced services are now leading to efforts in seeking to enhance the public safety network.

The above-described D2D communication may be extended and applied to signal transception between vehicles, and communication related to vehicles is particularly referred to as Vehicle-to-Everything (V2X) communication. In V2X, the term 'X' may denote Pedestrian, and, in this case, V2X may be indicated as V2P. Alternatively, the term 'X' may denote Vehicle, and, in this case, V2X may be indicated as V2V. Similarly, the term 'X' may denote Infra-structure/Network, and, in this case, V2X may be indicated as V2I/V2N, and so on. Meanwhile, Cellular (C)-V2X means V2X communication that is based on a cellular communication technology.

In a next-generation sidelink communication, various services may be supported, and these services may require higher latency and/or reliability-related requirements than in the related art. In this context, in order to satisfy the requirements related to the latency and reliability, a method of selecting transmission resource reflecting the number of retransmissions in advance is required when transmitting a sidelink message related to the service is transmitted.

SUMMARY

A technical object that is to be achieved by the present disclosure is to provide a resource selecting method of a sidelink terminal in a wireless communication system and a terminal using the method.

In one aspect, a resource selecting method of a sidelink terminal in a wireless communication system is provided.

The resource selecting method comprises: determining resource selection sub-windows in a resource selection window based on a repeated transmission number for a sidelink message; and selecting resource for transmitting the sidelink message within each of the resource selection sub-window, wherein the repeated transmission number includes the number of initial transmission and retransmission for the sidelink message.

A size of the resource selection sub-window for retransmission may be determined as a largest integer less than a value obtained by dividing the size of the resource selection window by the repeated transmission number.

The size of the resource selection sub-window for the initial transmission may be determined as a value obtained by subtracting a value obtained by multiplying the retransmission number by the size of the resource selection sub-window from the resource selection window.

The repeated transmission number may be determined based on at least one of capability of the terminal and a receiving terminal receiving the sidelink message and a requirement for the sidelink message.

The requirement may be related to latency or reliability.

The terminal may receive information on the capability of the receiving terminal from the receiving terminal.

The capability may include hybrid automatic repeat request (HARQ) round trip time (RTT) related processing capability of the terminal and the receiving terminal.

The capability may be a relatively lower value among the HARQ RTT related processing capabilities of the respective terminal and the receiving terminal.

The terminal may determine a number of resource selection sub-windows corresponding to the maximum repeated transmission available number when the maximum repeated transmission available number based on the capability is greater than a required repeated transmission number required for the requirement, and the terminal selects the resource within the number of resource selection sub-windows corresponding to the required repeated transmission number.

The terminal may select the resource within the number of resource selection sub-windows corresponding to the required repeated transmission number in earliest order on a time axis.

The terminal may determine a number of resource selection sub-windows corresponding to the maximum repeated transmission available number when the maximum repeated transmission available number based on the capability is less than the required repeated transmission number required for the requirement, and the terminal selects the resource within the determined resource selection sub-windows.

The repeated transmission number may be determined by a plurality of sidelink message transmission per resource selection sub-frame and a unit of a HARQ feedback for the transmission.

The terminal may select resource for the sidelink message transmission within each of the resource selection sub-windows excluding the last resource selection sub-window on the time axis.

The terminal may select the resource within each of the resource selection sub-windows including resource at a specific ratio or higher, and the specific ratio is a ratio of resource whose reference signal received power (RSRP) is equal to or lower than a threshold value among resources included in each of the resource selection sub-windows.

The specific ratio related to the resource selection sub-window for the initial transmission and the specific ratio related to the resource selection sub-window for the retransmission may be different from each other.

The repeated transmission number may relate to an HARQ feedback information transmission number of the receiving terminal receiving the sidelink message.

In another aspect, provided is a user equipment (UE) comprising: a transceiver configured to transmit and receive a wireless signal; and a processor operably coupled to the transceiver, wherein the processor is configured to determine resource selection sub-windows in a resource selection window based on a repeated transmission number for a sidelink message and to select resource for transmitting the sidelink message within each of the resource selection sub-window, wherein the repeated transmission number includes the number of initial transmission and retransmission for the sidelink message.

The UE may be a terminal which communicates with at least one of a mobile terminal, a network, and an autonomous driving vehicle other than the terminal.

ADVANTAGEOUS EFFECTS

According to the present disclosure, when a terminal selects a resource related to transmission of a sidelink message, the terminal may previously select or reserve a resource in advance based on the number of transmission and retransmission, so that the terminal may transmit the sidelink message through the selected resource or the reserved resource, and further, satisfy higher latency and/or reliability-related requirements for services supported by next-generation sidelink communication.

DESCRIPTION OF EXEMPLARY EMBODIMENTS

Figure 1:
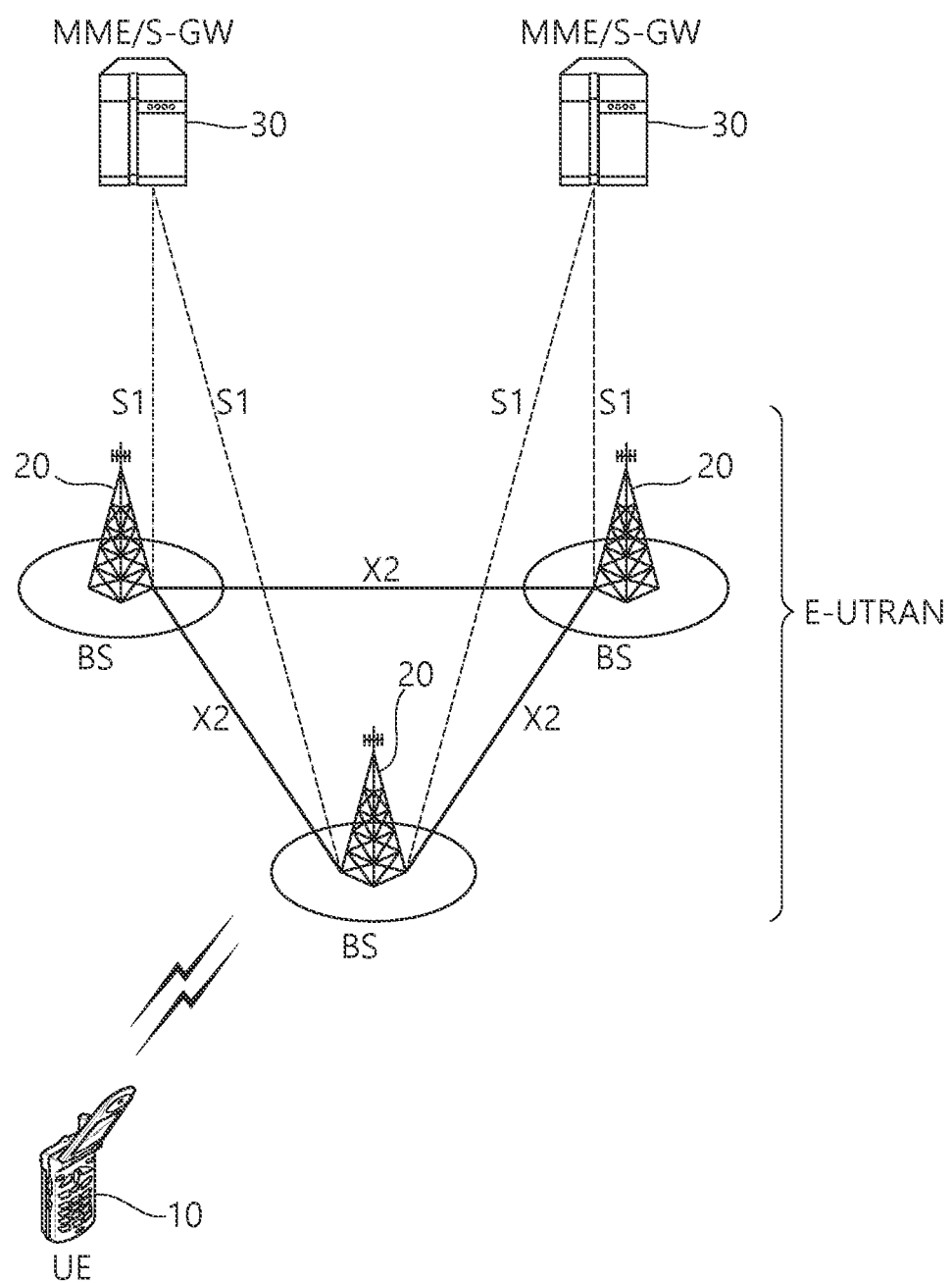
FIG. 1 shows a wireless communication system.

FIG. 1 shows a wireless communication system.

The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

The wireless communication system may be a TDD (time division duplex) system, a FDD (frequency division duplex) system, or a system using both of the TDD and the FDD.

Figure 2:
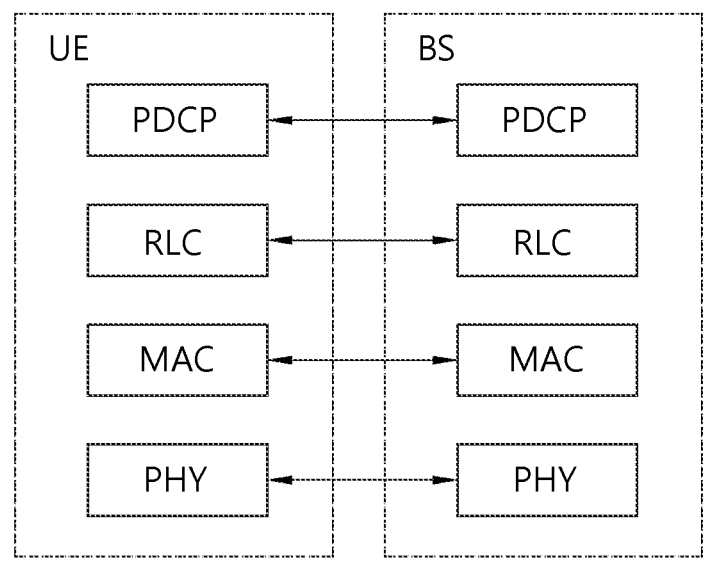
FIG. 2 is a diagram showing a wireless protocol architecture for a user plane.
Figure 3:
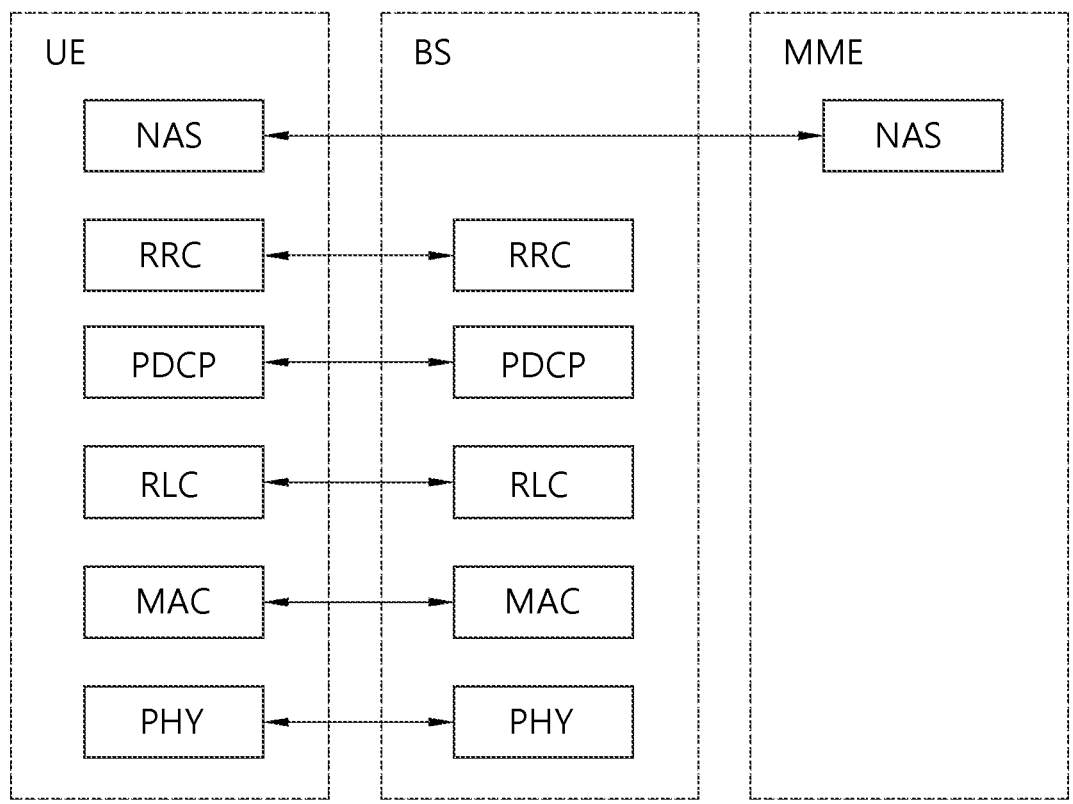
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, vehicle to everything (V2X) communication will be described. V2X denotes communication between a user equipment (UE) being installed in a vehicle and another UE. Herein, the other UE may be a pedestrian, a vehicle, an infrastructure. At this point, V2X may be referred to as vehicle to pedestrian (V2P), vehicle to vehicle (V2V), vehicle to infrastructure (V2I), respectively.

V2X communication may transceiver data/control information via sidelink being defined in a D2D operation and not uplink/downlink between a base station and UE being used in the legacy LTE communication.

In a sidelink physical channels may be defined as described below.

Physical Sidelink Broadcast Channel (PSBCH) is a physical sidelink broadcast channel. Physical Sidelink Control Channel (PSCCH) is a physical sidelink control channel. Physical Sidelink Discovery Channel (PSDCH) is a physical sidelink discovery channel. Physical Sidelink Shared Channel (PSSCH) is a physical sidelink shared channel. Sidelink Synchronization Signal (SLSS) is a sidelink synchronization signal. An SLSS may include a Primary Sidelink Synchronization Signal (PSSS) and a Secondary Sidelink Synchronization Signal (SSSS). The SLSS and the PSBCH may be transmitted together.

A sidelink may denote a UE-to-UE (or inter-UE) interface between, and a sidelink may correspond to a PC5.

Figure 4:
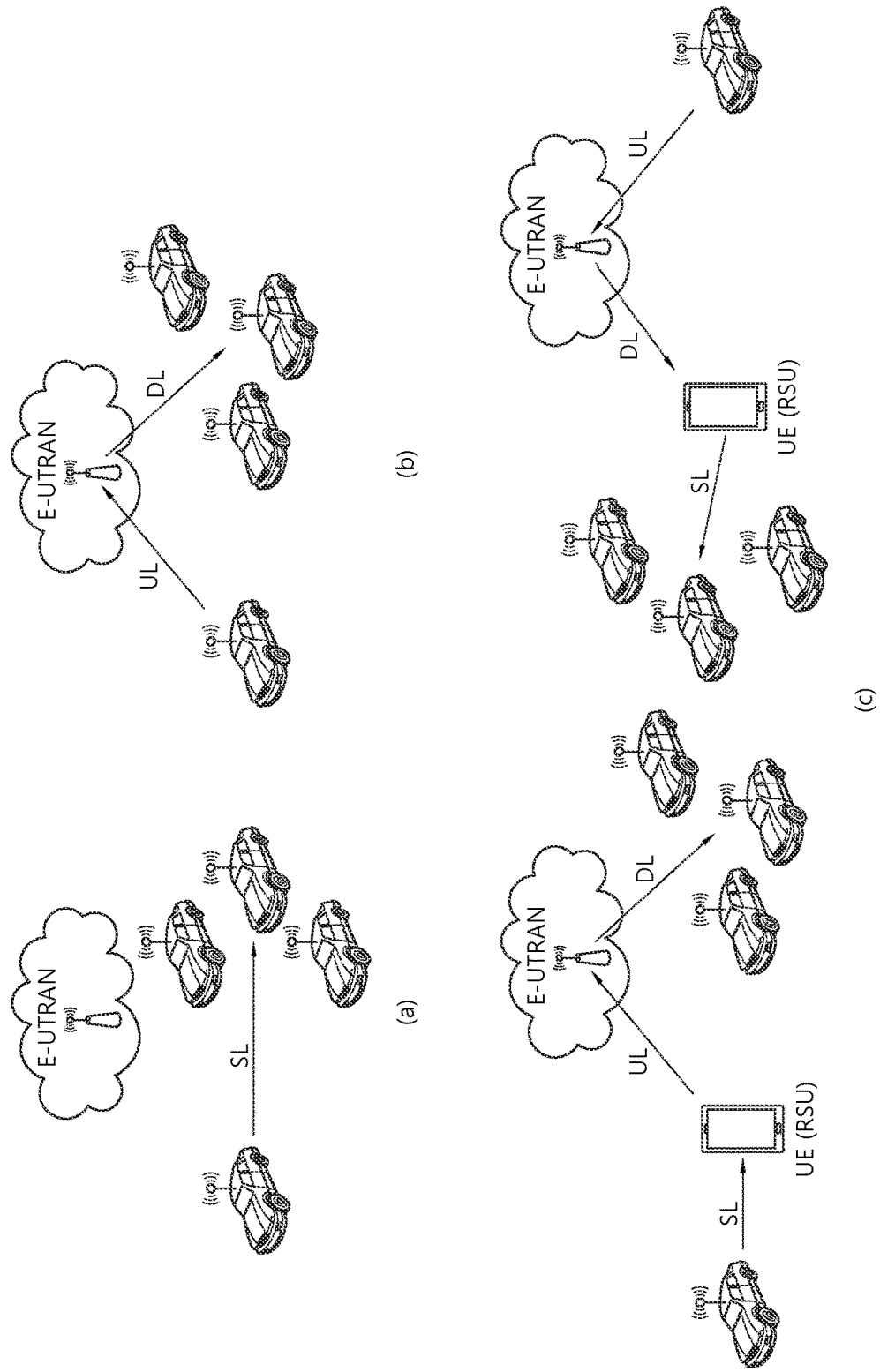
FIG. 4 shows exemplary scenarios for V2X communication.

FIG. 4 shows exemplary scenarios for V2X communication.

Referring to FIG. 4(a), V2X communication may support information exchange operations (between UEs) based on PC5, which is an inter-UE interface, and, as shown in FIG. 4(b), V2X communication may also support information exchange operations (between UEs) based on Uu, which is an interface between a base station (eNodeB) and a UE. Additionally, as shown in FIG. 4(c), V2X communication may also support information exchange operations (between UEs) based on both PC5 and Uu.

Figure 5:
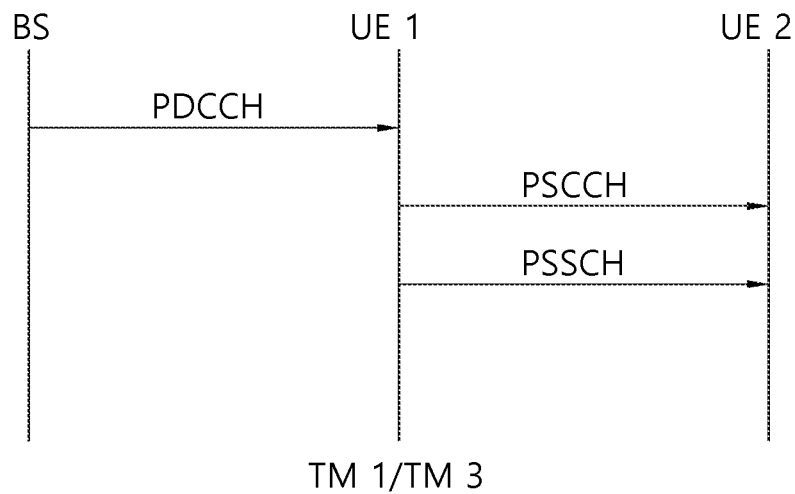
FIG. 5 shows exemplary UE operations according to a transmission mode (TM) related to V2X/D2D.
Figure 5:
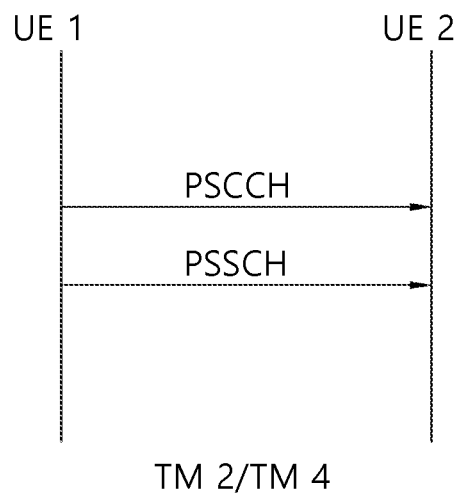

FIG. 5 shows exemplary UE operations according to a transmission mode (TM) related to V2X/D2D.

FIG. 5(a) relates to Transmission modes 1 and 3, and FIG. 5(b) relates to Transmission modes 2 and 4. In Transmission modes 1/3, the base station may perform resource scheduling to UE 1 through a PDCCH (more specifically, DCI), and UE 1 may perform D2D/V2X communication with UE 2 in accordance with the corresponding resource scheduling. After transmitting sidelink control information (SCI) to UE 2 through a physical sidelink control channel (PSCCH), UE 1 may transmit data that is based on the SCI through a physical sidelink shared channel (PSSCH). Transmission mode 1 may be applied to D2D, and Transmission mode 3 may be applied to V2X.

Transmission modes 2/4 may be modes according to which the UE performs self-scheduling. More specifically, Transmission mode 2 may be applied to D2D, wherein the UE may select a resource by itself from a configured resource pool and perform D2D operations. Transmission mode 4 may be applied to V2X, wherein, after performing sensing/SA decoding processes, and so on, the UE may select a resource by itself from a selection window and may then perform V2X operations. After transmitting SCI to UE 2, UE 1 may transmit data that is based on the SCI through the PSSCH. Hereinafter, the term Transmission mode may be briefly referred to as Mode.

Control information being transmitted by the base station to the UE through the PDCCH may be referred to as downlink control information (DCI), whereas control information being transmitted by the UE to another UE through the PSCCH may be referred to as SCI. The SCI may transfer (or deliver) sidelink scheduling information. Various formats may exist in the SCI, e.g., SCI Format 0 and SCI Format 1 may exist in the SCI.

SCI Format 0 may be used for scheduling of a PSSCH. SCI Format 0 may include a frequency hopping flag (1 bit), a resource block allocation and hopping resource allocation field (the number of bits may vary in accordance with the number of resource blocks of the sidelink), a time resource pattern (7 bits), a modulation and coding scheme (MCS) (5 bits), a time advance indication (11 bits), a group destination ID (8 bits), and so on.

SCI Format 1 may be used for scheduling of a PSSCH. SCI Format 1 may include priority (3 bits), resource reservation (4 bits), frequency resource location of initial transmission and retransmission (the number of bits may vary in accordance with the number of sub-channels of the sidelink), time gap between initial transmission and retransmission (4 bits), MCS (5 bits), retransmission index (1 bit), reserved information bits, and so on. Reserved information bits may be briefly referred to as reserved bits. The reserved bits may be added until a bit size of SCI Format 1 becomes 32 bits. More specifically, SCI Format 1 includes multiple fields each including different types of information. And, herein, the remaining number of bits from excluding the total number of bits of the multiple fields from the fixed total number of bits (32 bits) of SCI Format 1 may be referred to as the reserved bits.

SCI Format 0 may be used in Transmission modes 1 and 2, and SCI Format 1 may be used in Transmission modes 3 and 4.

Techniques, apparatus and systems described herein can be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as Universal Terrestrial Radio Access (UTRA) or CDMA2000. The TDMA may be implemented with a radio technology such as Global System for Mobile communications (GSM)/General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink and employs the SC-FDMA in uplink. LTE-advanced (LTE-A) is an evolution of the 3GPP LTE. For clarity, this application focuses on the 3GPP LTE/LTE-A. However, technical features of the present disclosure are not limited thereto.

Figure 6:
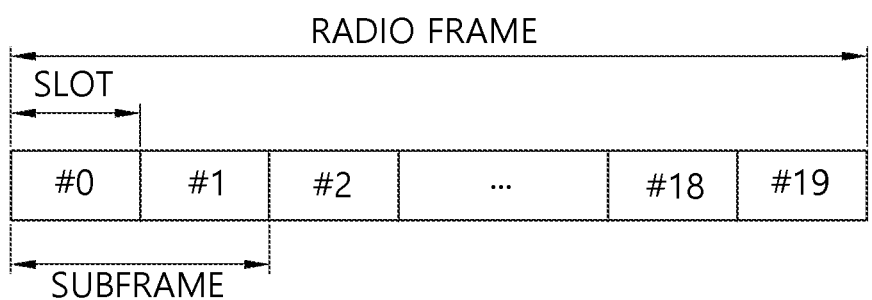

FIG. 6 schematically describes a structure of a radio frame of 3GPP LTE.

Referring FIG. 6, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

Figure 7:
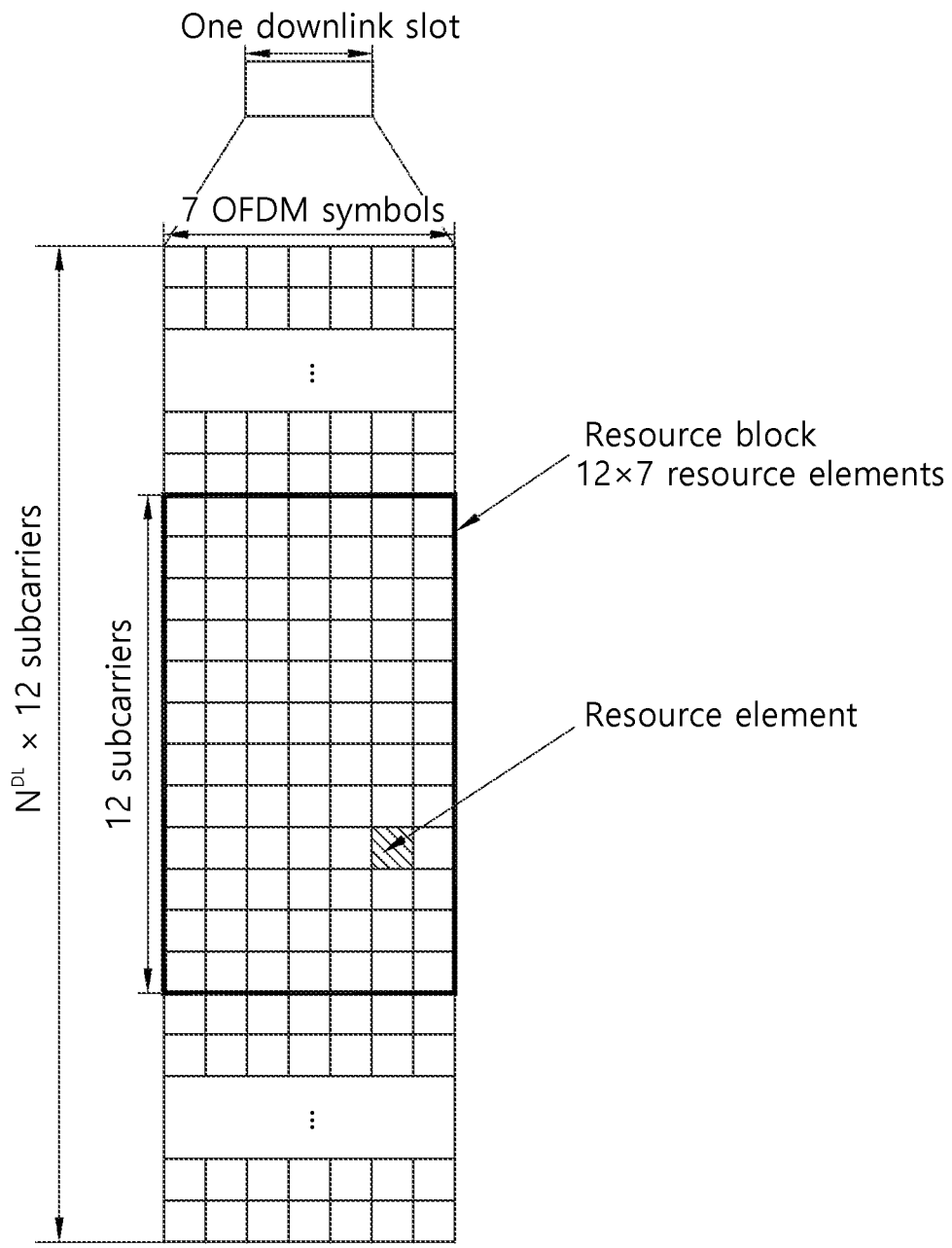
FIG. 7 describes a resource grid for one downlink slot.

FIG. 7 describes a resource grid for one downlink slot.

Referring FIG. 7, a downlink slot includes a plurality of OFDM symbols in time domain. It is described herein that one downlink slot includes 7 OFDM symbols, and one resource block (RB) includes 12 subcarriers in frequency domain as an example. However, the present disclosure is not limited thereto. Each element on the resource grid is referred to as a resource element (RE). One RB includes 12×7 REs. The number NDL of RBs included in the downlink slot depends on a downlink transmit bandwidth. The structure of an uplink slot may be same as that of the downlink slot.

Figure 8:
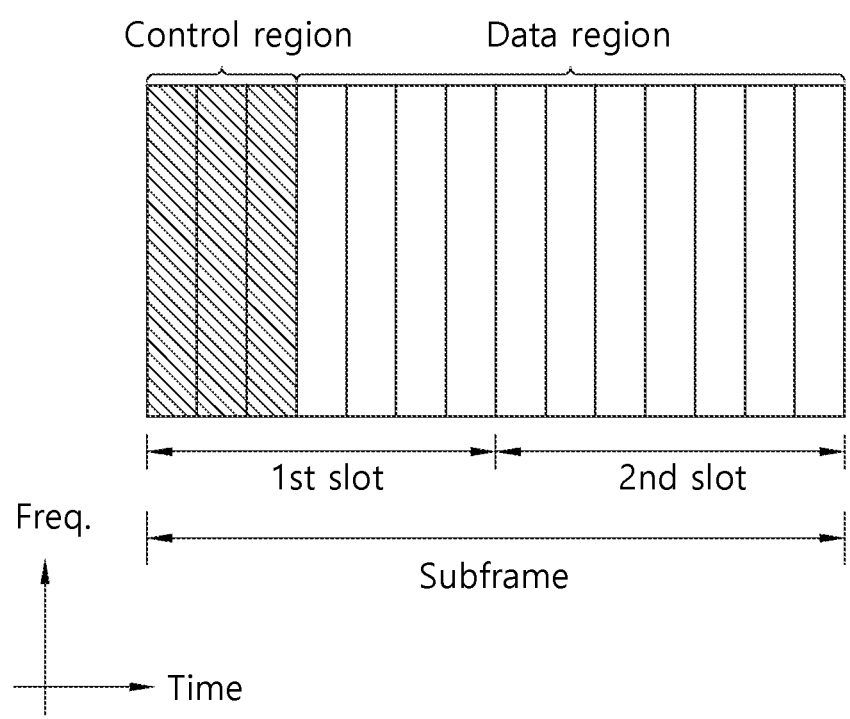
FIG. 8 schematically describes a structure of downlink subframe.

FIG. 8 schematically describes a structure of downlink subframe.

Referring FIG. 8, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 9:
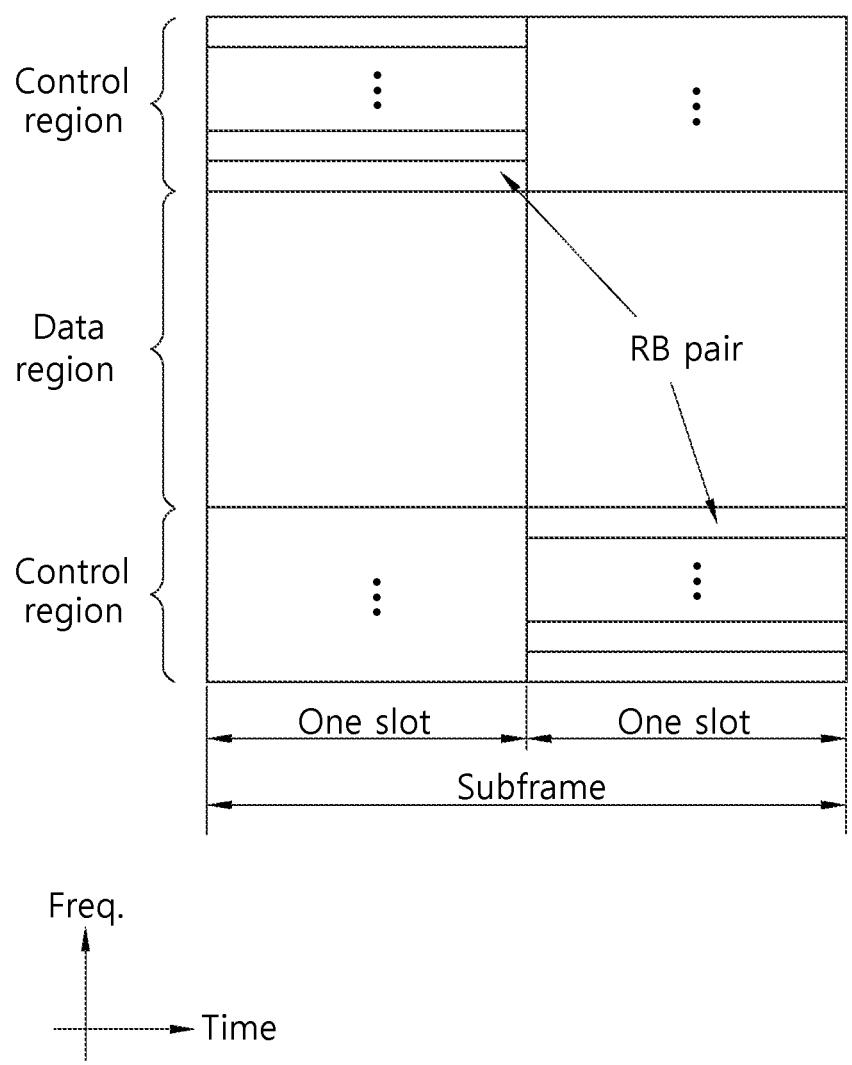
FIG. 9 schematically describes a structure of uplink subframe.

FIG. 9 schematically describes a structure of uplink subframe.

Referring FIG. 9, an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Hereinafter, the present disclosure will be described.

In a next-generation communication system, various use cases may be supported. For example, a service for communication such as an autonomous vehicle, a smart car, or a connected car may be considered. For this service, each vehicle exchanges information as a communicatable terminal, and a resource for communication may be selected and messages may be exchanged between terminals by receiving help from a base station or without help from the base station depending on the situation.

The present disclosure proposes a new method for a terminal to select a resource to transmit information in consideration of HARQ transmission in V2X communication.

The embodiments in the present disclosure may be regarded as a single proposed method, but combinations between each disclosure and/or embodiments may also be considered as a new method. In addition, the disclosure matters may not be limited to the embodiments presented in the present disclosure, and are not limited to a specific system.

All (parameter) and/or (operation) and/or (combination between each parameter and/or operation) and/or (whether or not the corresponding parameter and/or operation is applied) and/or (whether a combination is applied between each parameter and/or operation) of the present disclosure may be (pre)cured or defined in advance in a system through higher layer signaling and/or physical layer signaling.

In addition, each matter of the present disclosure is defined as one operation mode, and one of them is (pre) configured to a terminal through higher layer signaling and/or physical layer signaling so that a base station operates according to a corresponding operation mode. A TTI of the present disclosure may correspond to a unit of various lengths such as sub-slot/slot/subframe or a basic unit of transmission, and a terminal of the present disclosure may correspond to various types of devices such as a vehicle and a pedestrian terminal.

In addition, matters related to the operation of the terminal and/or the base station and/or the RSU in the present disclosure are not limited to each device type and may be applied to different types of devices. For example, in the present disclosure, matters described as the operation of the base station may be applied to the terminal.

In the V2X system, an operation of directly selecting a resource based on sensing in order for the terminal to transmit information may be considered. Here, a time axis range of the candidate resource that can be selected and/or whether or not HARQ is transmitted may be different according to a requirement (e.g., a requirement for latency or reliability) corresponding to the corresponding transmission information.

For example, a window size of a candidate resource that may be selected according to latency requirement of a corresponding service may be defined on a time axis, and in the case of transmitting HARQ according to a transmission type (e.g., unicast, groupcast, etc.) or service requirement, etc., a time axis window (which may be referred to as a resource selection window) of candidate resources defined according to the latency requirement may be divided into a plurality of sub-windows in consideration of the number of corresponding HARQ transmissions and resource selection for initial transmission and retransmission may be performed in each sub-window. Through this, resources for retransmission may also be reserved through sensing in advance.

To this end, the resource selection window may be divided into the number of sub-windows corresponding to the repeated transmission number (which may be a value considering initial transmission and maximum retransmission number, for example) (required for satisfying the corresponding requirement) required according to the requirement corresponding to the information to be transmitted.

For example, a size of the resource selection sub-window for retransmission may be determined as floor ((resource selection window size)/(repeated transmission number)), and a size of the resource selection sub-window for initial transmission may be determined as [(resource selection window size)−floor((resource selection window size)/(repeated transmission number))·(repeated transmission number−1)] by subtracting all the size of the resource selection sub-window for retransmission from the resource selection window. Here, the floor function expressed as floor(x) is a function that calculates the largest value among integers less than or equal to x.

Through this operation, for example, when transmitting information with strict target requirement, a maximum number of retransmissions is guaranteed, and at a time of initial transmission, a resource that may be used for retransmission may be selected and reserved in advance.

Figure 10:
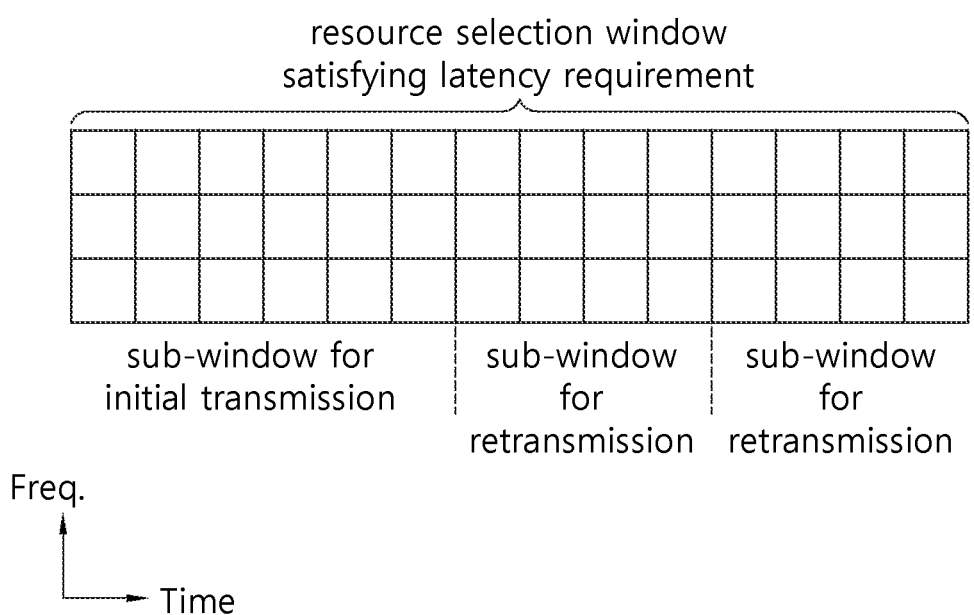
FIG. 10 schematically shows an example of configuring a sub-window for the purpose of initial transmission and retransmission by dividing a resource selection window.

FIG. 10 schematically shows an example of configuring a sub-window for the purpose of initial transmission and retransmission by dividing a resource selection window.

FIG. 10 shows an example of dividing a resource selection window into a total of three resource selection sub-windows in consideration of initial transmission and two retransmissions. Here, the number of two retransmissions may be determined based on a requirement for retransmission of information to be transmitted.

Here, as described above, since a size of the resource selection sub-window for retransmission may be determined as floor ((resource selection window size)/(repeated transmission number)), a size of the resource selection sub-window for retransmission is determined as floor(14/3)=4 according to FIG. 10.

In addition, as described above, the size of the resource selection sub-window for initial transmission may be determined as [(resource selection window size)−floor((resource selection window size)/(repeated transmission number))·(repeated transmission number−1)] by subtracting all the sizes of the resource selection sub-windows for retransmission from the resource selection window, the size of the resource selection sub-window for initial transmission is determined as (14)−floor(14/3)·(3−1)=14−8=6 according to FIG. 10.

Accordingly, the terminal may select a resource for initial transmission in the resource selection sub-window for initial transmission and perform initial transmission through the selected resource for initial transmission. In addition, the terminal may select a resource for each retransmission in each resource selection sub-window for retransmission and perform retransmission through the selected resource for each retransmission.

In addition to this, the size of the sub-window may be determined in consideration of a maximum transmission available number within the resource selection window according to the capability of the terminal. When establishing a session, the transmitting and receiving terminals that exchange transmission may exchange processing capability information of each terminal. Through this, it is possible to know a time for transmitting HARQ after the receiving terminal receives data transmitted from the transmitting terminal and a time to a time point at which data can be retransmitted after the transmitting terminal receives the corresponding HARQ, based on which HARQ round tip time (RT) may be calculated. Here, the RTT may refer to a time interval from a time point of transmission of a specific signal to a time point of retransmission upon receiving feedback information for the specific signal.

For example, if the processing capability of the transmitting terminal is higher than the processing capability of the receiving terminal, when the transmitting terminal selects transmission and retransmission resource based on the processing its capability using the above method to transmit information, the transmitting terminal may perform retransmission in a state in which the receiving terminal has not received feedback information for the information or has not completed processing. As an example of a method for solving this problem, HARQ RTT may be calculated based on a terminal having a low capability among transmitting and receiving terminals, and based on this, a maximum number of transmission including initial transmission and retransmission) available within the resource selection window according to the requirement corresponding to the transmitted information may be calculated through an equation such as floor ((resource selection window size)/(HARQ RTT)). In this case, in order to select resources for initial transmission and retransmission, the resource selection window may be divided into a plurality of sub-windows in consideration of the maximum transmission available number. For example, the size of the resource selection sub-window for retransmission may be determined as floor ((resource selection window size)/(maximum transmission available number)), and the size of the resource selection sub-window for initial transmission may be determined as [(resource selection window size)−floor((resource selection window size)/(maximum transmission available number))·(maximum transmission available number−1)] by subtracting all the sizes of the resource selection sub-windows for retransmission from the resource selection window. That is, when the resource selection window size is divided by the maximum transmission available number, remaining resources may be generated, and such resources may be included in the resource selection sub-window for initial transmission.

Figure 11:
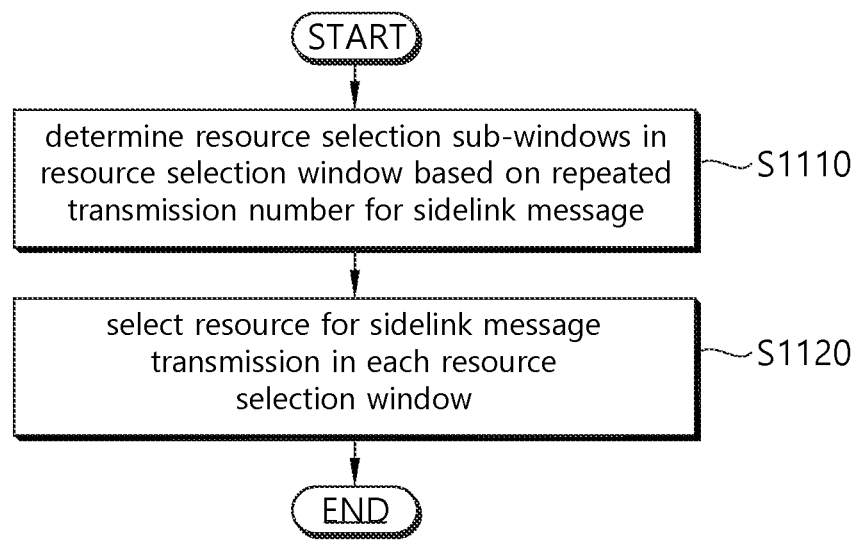
FIG. 11 is a flowchart of a method for selecting a resource of a sidelink terminal according to an embodiment of the present disclosure.

FIG. 11 is a flowchart of a method for selecting a resource of a sidelink terminal according to an embodiment of the present disclosure.

Referring to FIG. 11, the terminal determines resource selection sub-windows in the resource selection window based on the repeated transmission number for a sidelink message (S1110). Here, the repeated transmission number may include the number of initial transmissions and retransmissions for the sidelink message.

Thereafter, the terminal selects a resource for transmitting the sidelink message in each of the resource selection sub-windows (S1120).

Here, a size of the resource selection sub-window may be determined based on the aforementioned equations. Furthermore, specific embodiments disclosed in this disclosure may be applied to the terminal.

Meanwhile, this operation may be applied only when the repeated transmission number required for information transmission exceeds the maximum transmission available number derived based on HARQ RTT. For example, if the repeated transmission number required in terms of a service is 5 and the maximum transmission available number derived based on HARQ RT is 3, and in this case, even if the transmitting terminal selects resources for transmission and retransmission based on the repeated transmission number of 5 times and performs a transmission operation based thereon, the 5 transmissions may not be properly processed due to limitations of processing capability of the receiving terminal. In this case, the transmitting terminal may select resources for transmission and retransmission operation based on the maximum transmission available number (three times according to the above example) derived based on the HARQ RTT.

Meanwhile, here, the repeated transmission number required in terms of a service may be the repeated transmission number required for the requirement, and the maximum transmission available number derived based on HARQ RT may be a maximum transmission available number determined based on a capability such as a processing capability of the terminal transmitting the sidelink message and the terminal receiving the sidelink message.

In addition, in this operation, if the repeated transmission number required for information transmission is less than the maximum transmission available number derived based on HARQ RT, resource selection and transmission may be performed only in some (e.g., in sub-windows corresponding to the number corresponding to the repeated transmission number) among a plurality of sub-windows derived based on HARQ RU. For example, if the repeated transmission number required for specific information transmission is 3 and the maximum transmission available number derived based on HARQ RTT is 5, the terminal may determine 5 resource selection sub-windows in the resource selection window, select resources using three sub-windows in the earliest order in a time domain, and use resources corresponding to the remaining two resource selection sub-windows for other purposes such as transmission of other information. Through this method, the terminal may perform a resource-efficient sidelink operation.

Figure 12:
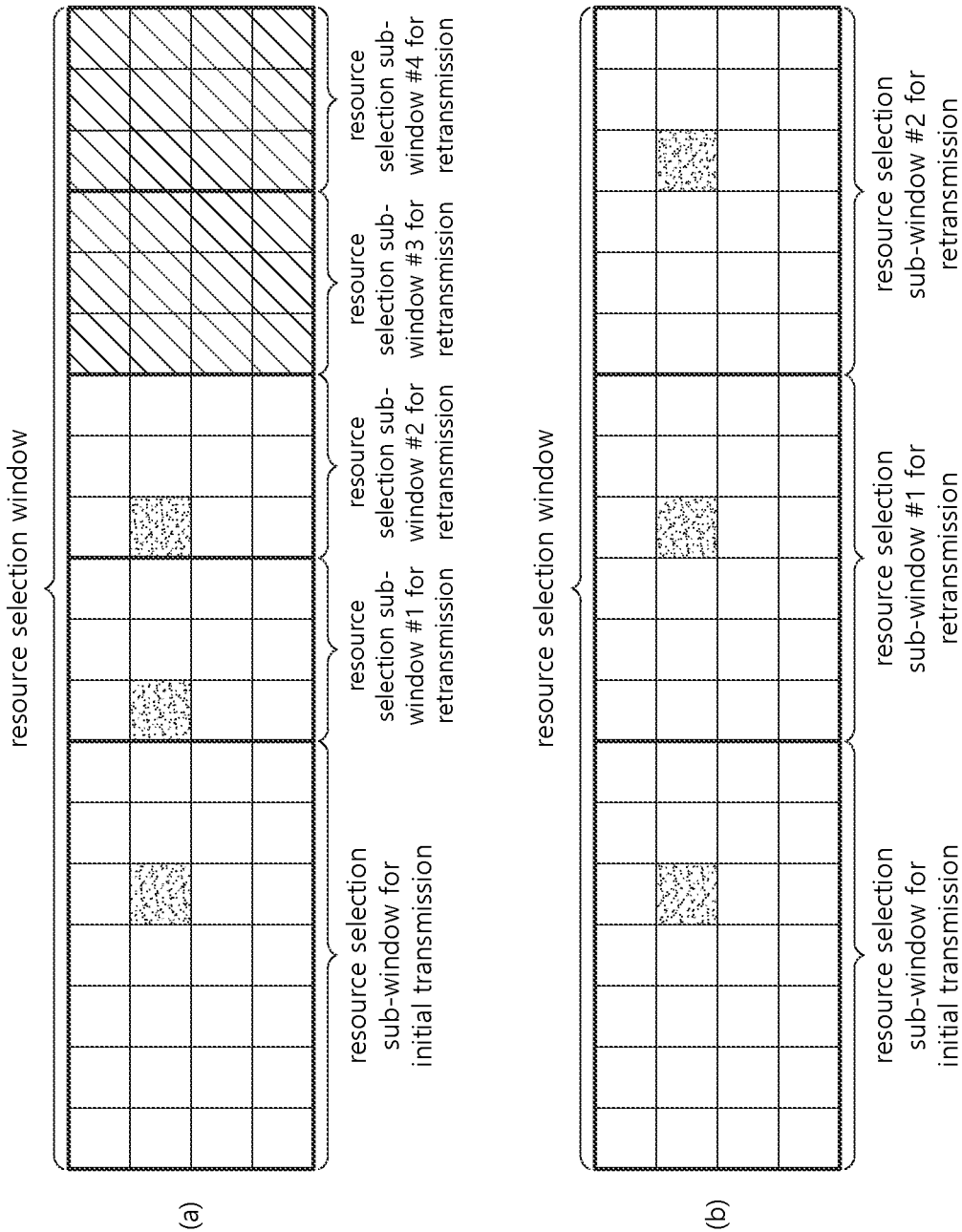
FIG. 12 schematically illustrates an example in which, on a position of a transmitting terminal transmitting a sidelink message, a method of selecting resource of the transmitting terminal based on a capability of the transmitting terminal and a receiving terminal receiving the sidelink message and requirement for the sidelink message is applied, according to another embodiment of the present disclosure.

FIG. 12 schematically illustrates an example in which, on a position of a transmitting terminal transmitting a sidelink message, a method of selecting resource of the transmitting terminal based on a capability of the transmitting terminal and a receiving terminal receiving the sidelink message and requirement for the sidelink message is applied, according to another embodiment of the present disclosure.

Specifically, (a) of FIG. 12 shows an example in which the resource selecting method of the transmitting terminal is applied when the maximum repeated transmission available number based on the capability is greater than a required repeated transmission number required for the requirement, and FIG. 12B shows an example in which the resource selecting method of the transmitting terminal is applied when the maximum repeated transmission available number based on the capability is smaller than the required repeated transmission number required for the requirement.

According to (a) of FIG. 12, for example, when the maximum repeated transmission available number based on the capability is 5 and the required repeated transmission number required for the requirement is 3, the transmitting terminal determines a resource selection sub-window based on the maximum repeated transmission available number (i.e., 5 according to the example of FIG. 12).

Specifically, since the resource selection window size is 19, the resource selection sub-window for retransmission is determined as floor(19/5)=3 and the resource selection sub-window for initial transmission is determined as 19−(3*4) =7. Here, since the required repeated transmission number required for the above requirement is 3, the terminal may select resource for a sidelink message transmission for each of the resource selection sub-window for initial transmission, the resource selection sub-window #1 for retransmission, and the resource selection sub-window #2 for retransmission. In addition, resources corresponding to resource selection sub-window #3 for retransmission and resource selection sub-window #4 for retransmission may be used for purposes other than transmitting the sidelink message.

According to (b) of FIG. 12, for example, if the maximum repeated transmission available number based on the capability is 3 and the required repeated transmission number required for the requirement is 5, the transmitting terminal determines the resource selection sub-window based on the maximum repeated transmission available number.

Specifically, since the resource selection window size is 19, the resource selection sub-window for retransmission is determined as floor(19/3)=6, and the resource selection sub-window for initial transmission is 19−(6*2)=7. Here, since the required repeated transmission number required for the requirement is 3, the terminal may select resource for sidelink message transmission for each of resource selection sub-window for initial transmission, the resource selection sub-window #1 for retransmission, and the resource selection sub-window #2 for retransmission.

Further, a blind repetition method may be applied in a specific number unit. Here, the blind repetition may refer to an operation of receiving feedback information for a plurality of transmission operations at once. For example, if the repeated transmission number required for information transmission is 4, blind repetition may be applied in units of two so that HARQ transmission may be performed only once for the two. In this case, the two transmissions may be transmitted continuously in the time axis and/or the frequency axis or may be transmitted separately.

Meanwhile, the above equation may also be modified accordingly. For example, in the aforementioned example, in the equation, the 'repeated transmission number' may be replaced by the 'repeated transmission number/blind repeated performing number, and the 'maximum transmission available number' may be replaced by the 'maximum transmission available number/blind repeated performing number'. In the case of 'HARQ RTT', for example, when blind repetition is continuously performed on a time axis, it may be replaced with 'HARQ RTT+1'. Here, the addition of 1 to the HARQ RTT is based on the blind repetition in two units according to the aforementioned example, and more generally described, for example, when the repeated transmission number to which the blind repetition is applied is n+1 (here, n Is an integer), 'HARQ RTT' may be replaced with 'HARQ RTT+n'.

Figure 13:
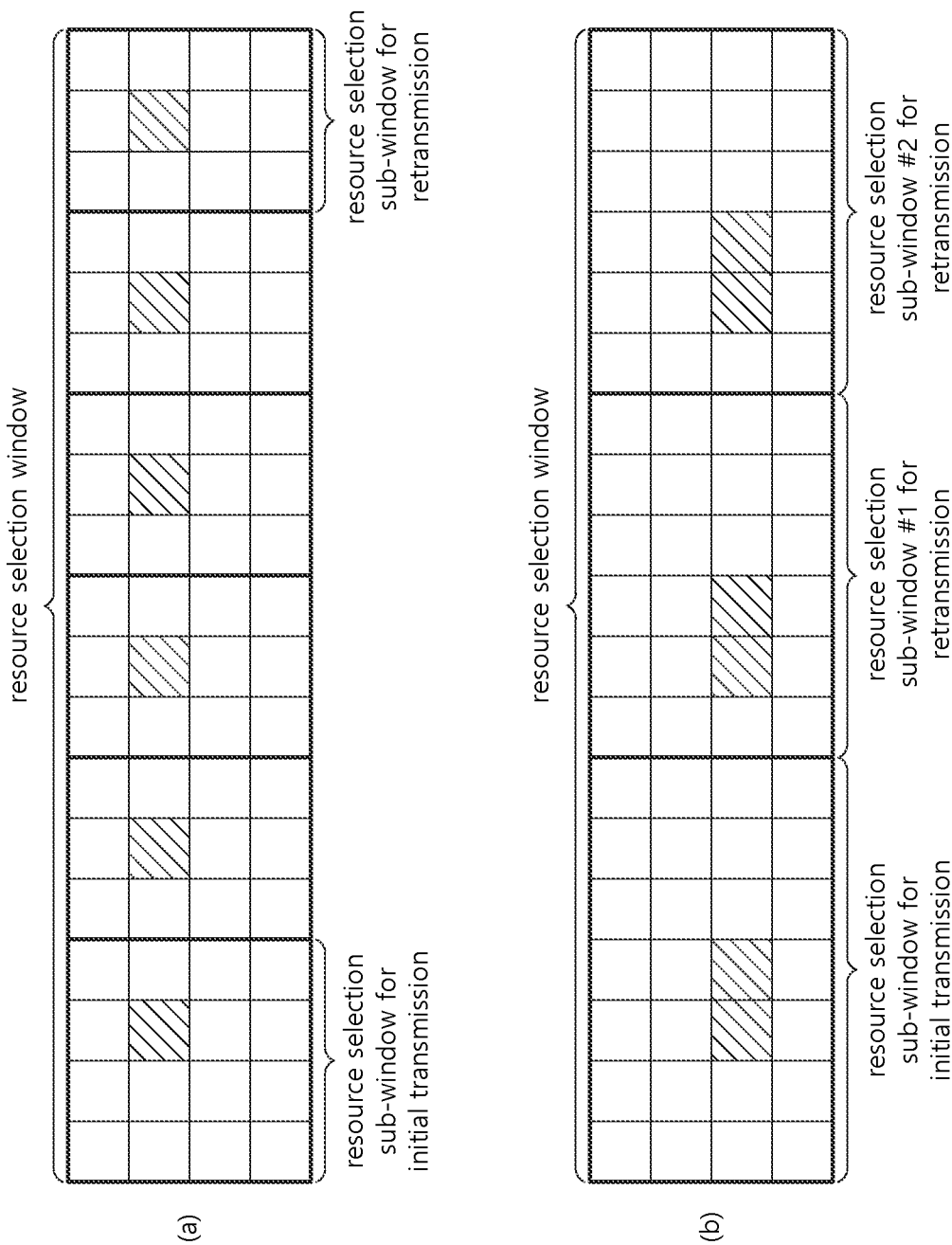
FIG. 13 schematically illustrates an example in which a resource selecting method of a terminal based on whether blind repetition is applied according to another embodiment of the present disclosure is applied.

FIG. 13 schematically illustrates an example in which a resource selecting method of a terminal based on whether blind repetition is applied according to another embodiment of the present disclosure is applied.

FIG. 13 relates to a case where the repeated transmission number when blind repetition is not applied to a specific sidelink message is 6, (a) of FIG. 13 schematically illustrates an example of a resource selecting method of a terminal when blind repetition is not applied, and (b) of FIG. 13 schematically illustrates an example of a resource selecting method of a terminal when blind repetition is applied.

According to (a) of FIG. 13, since the size of the resource selection window is 19 and the repeated transmission number is 6, the size of the resource selection sub-window for retransmission is determined as floor(19/6)=3 and the size of the resource selection sub-window for initial transmission is determined as 19−(3*5)=4. Here, the transmitting terminal transmitting the specific sidelink message may determine resources for initial transmission and retransmission as shaded resources.

According to (b) of FIG. 13, when blind repetition is performed in units of two, the size of the resource selection window is 19 and the repeated transmission number in two units considering blind repetition is 6/2=3, and thus, the size of the resource selection sub-window for retransmission is determined as floor(19/3)=6 and the size of the resource selection sub-window for initial transmission is determined as 19−(6*2)=7. That is, in (b) of FIG. 13, a resource related to transmission of a sidelink message twice per one resource selection subframe may be selected. Here, the number of HARQ feedback received by the terminal for the two sidelink message transmissions may be 1. In addition, here, the transmitting terminal transmitting the specific sidelink message may determine resources for initial transmission and retransmission as shaded resources.

Meanwhile, in (b) of FIG. 13, an example in which two resources for transmission, which are units in which blind repetition is performed, are successively selected on the time axis is illustrated, but this is only an example, and as described herein the resources may be selected continuously on the frequency axis or may be selected separately.

In this environment, in order to guarantee HARQ transmission for each transmission, resource selection and transmission may not be performed in the last sub-window of the sub-windows. This considers a case in which the transmitting terminal may not be able to receive HARQ feedback according to a position of the selected resource when transmission is performed in the resource selected for the last sub-window. For this operation, in the operation of determining the size of the sub-window based on the repeated transmission number required for the information to be transmitted during the operation, the repeated transmission number is replaced with the "repeated transmission number+1," so as to be applied, thereby guaranteeing the required repeated transmission number. For example, the size of the sub-window may be configured as floor((resource selection window size)/(repeated transmission number+1)).

Alternatively, resource selection and transmission may be performed in all of the sub-windows to ensure the maximum transmission available number. In this case, HARQ transmission may not be performed for information transmitted in the last sub-window. For this operation, when transmitting data, the terminal may transmit control information including scheduling information of the corresponding data, including information on the number of times the data is transmitted. Here, as described above, when transmitting the data including information on the number of times the data is transmitted, it may include information on the number of transmissions dropped before the corresponding transmission. Through this, the terminal receiving the data may apply differently whether to perform HARQ transmission according to the number of times the corresponding data is repeatedly transmitted. For example, the repeated transmission number required according to requirement corresponding to the transmission information may be compared with information on the number of transmissions of received data, and if they are the same, HARQ transmission may not be performed for corresponding data transmission. When transmitting the control information, the operation may be performed by transmitting information on whether the corresponding transmission requires HARQ transmission in addition to information on the transmission order of data scheduled by the corresponding control information.

In addition, when selecting a resource for data transmission, an operation of reporting resource at a specific ratio in which an RSRP does not exceed a specific threshold among the total resources in the resource selection window based on measurement in a physical layer to a higher layer and finally selecting transmission resource in the higher layer may be considered. The specific ratio may be applied differently depending on the priority or reliability requirement of transmitted information and may be (pre)configured to the terminal by the base station through higher layer signaling and/or physical layer signaling or may be defined in a system in advance.

Meanwhile, this operation may be performed on the entire resource of the resource selection window, or when the resource selection window is divided in consideration of HARQ transmission, the operation may be performed on a resource in a corresponding sub-window in units of each sub-window. For example, the above operation may be performed by dividing a resource for initial transmission and a resource for retransmission. If a resource of the specific ratio is selected for the entire resource of the resource selection window, there may be a case where the resource does not exist in the sub-window divided in consideration of the HARQ transmission according to situations. In this case, the transmission in the corresponding sub-window may be dropped, and eventually the number of retransmissions may be considered as being limited.

In addition, if the ratio of the resources whose RSRP does not exceed a specific threshold, among the resources in the sub-window divided in consideration of the HARQ transmission, the threshold may be increased until the corresponding ratio is satisfied. However, in this case, when resource in the sub-window corresponding to a resource not monitored for the reason in which a sensing terminal performs transmission or the like is excluded from the resource selection, only resource smaller than the specific ratio may be monitored in the corresponding sub-window (that is, in a case where a large amount of resource is excluded from the selection target and resource as much as satisfying the specific ratio cannot be selected). In this case, transmission in the corresponding sub-window may be dropped and all remaining resource may be selected or resource corresponding to a specific ratio among the remaining resources may be selected in consideration of the remaining resources.

If the resource of the specific ratio is selected for the resource in each sub-window divided by considering the HARQ transmission, the same value of the corresponding specific ratio may be applied to all sub-windows or different values may be applied. For example, different ratios may be applied between initial transmission and subsequent retransmission. If the ratio when selecting a resource for retransmission is applied to a lower ratio than when selecting a resource for initial transmission, it may help to reduce the number of additional retransmissions by using a resource with less interference for retransmission. Alternatively, for the purpose of reducing the occurrence of retransmissions itself, a ratio when selecting resources for initial transmission may be applied to be lower than when selecting resources for retransmission.

The claims set forth in the specification can be combined in a variety of ways. For example, the technical features of the method claims of the present specification may be combined to be implemented as a device, and the technical features of the device claims of the present specification may be combined to be implemented by a method. In addition, the technical features of the method claim of the present specification and the technical features of the device claim may be combined to be implemented as a device, and the technical features of the method claim of the present specification and the technical features of the device claim may be combined to be implemented by a method.

Figure 14:
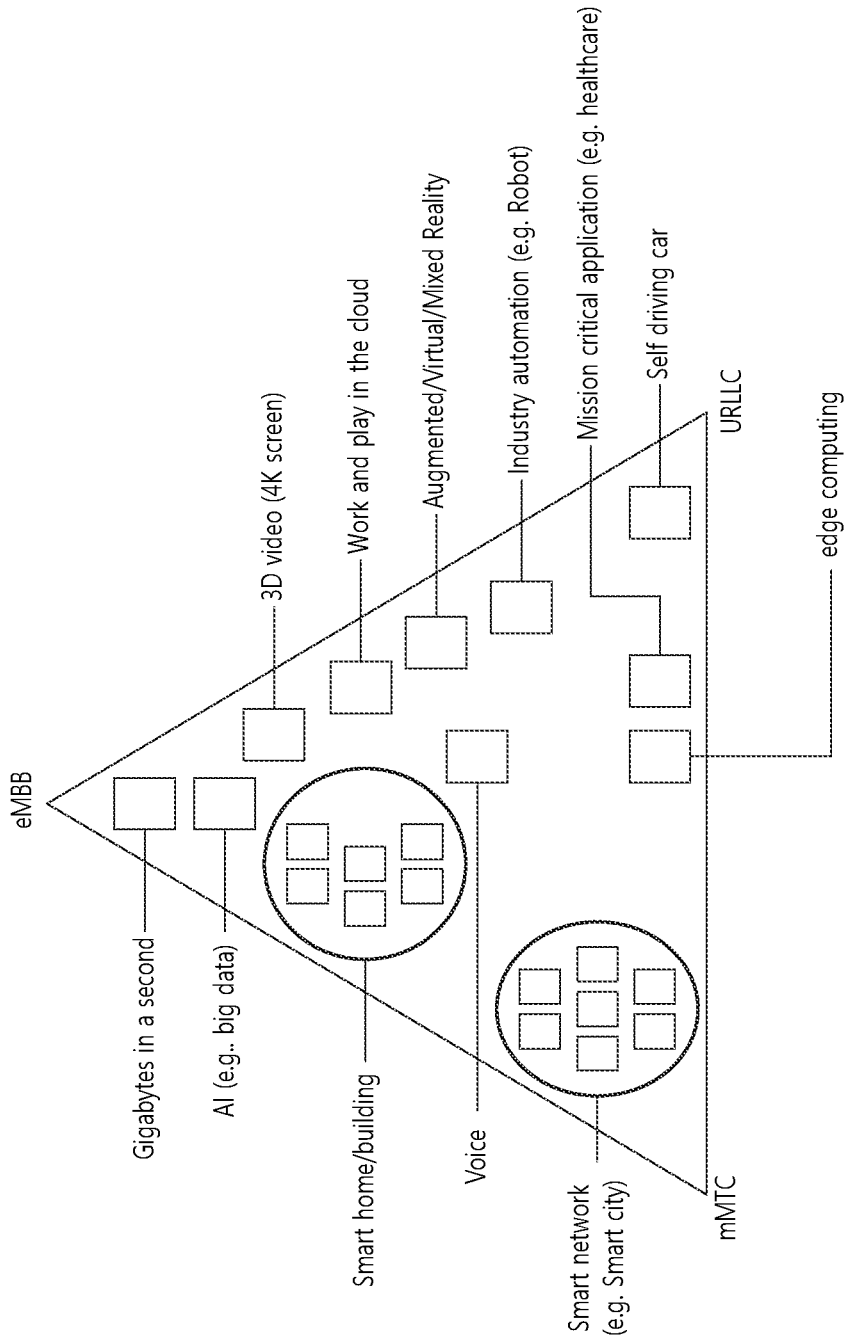
FIG. 14 shows examples of 5G usage scenarios to which the technical features of the present disclosure can be applied.

FIG. 14 shows examples of 5G usage scenarios to which the technical features of the present disclosure can be applied. The 5G usage scenarios shown in FIG. 14 are only exemplary, and the technical features of the present disclosure can be applied to other 5G usage scenarios which are not shown in FIG. 14.

Referring to FIG. 14, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 14 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Various descriptions, functions, procedures, proposals, methods, and/or operational flowcharts disclosed herein may be applied to, but not limited to, various fields requiring wireless communication/connection (e.g., 5G) between devices.

Hereinafter, specific examples are illustrated with reference to drawings. In the following drawings/description, unless otherwise indicated, like reference numerals may refer to like or corresponding hardware blocks, software blocks, or functional blocks.

Figure 15:
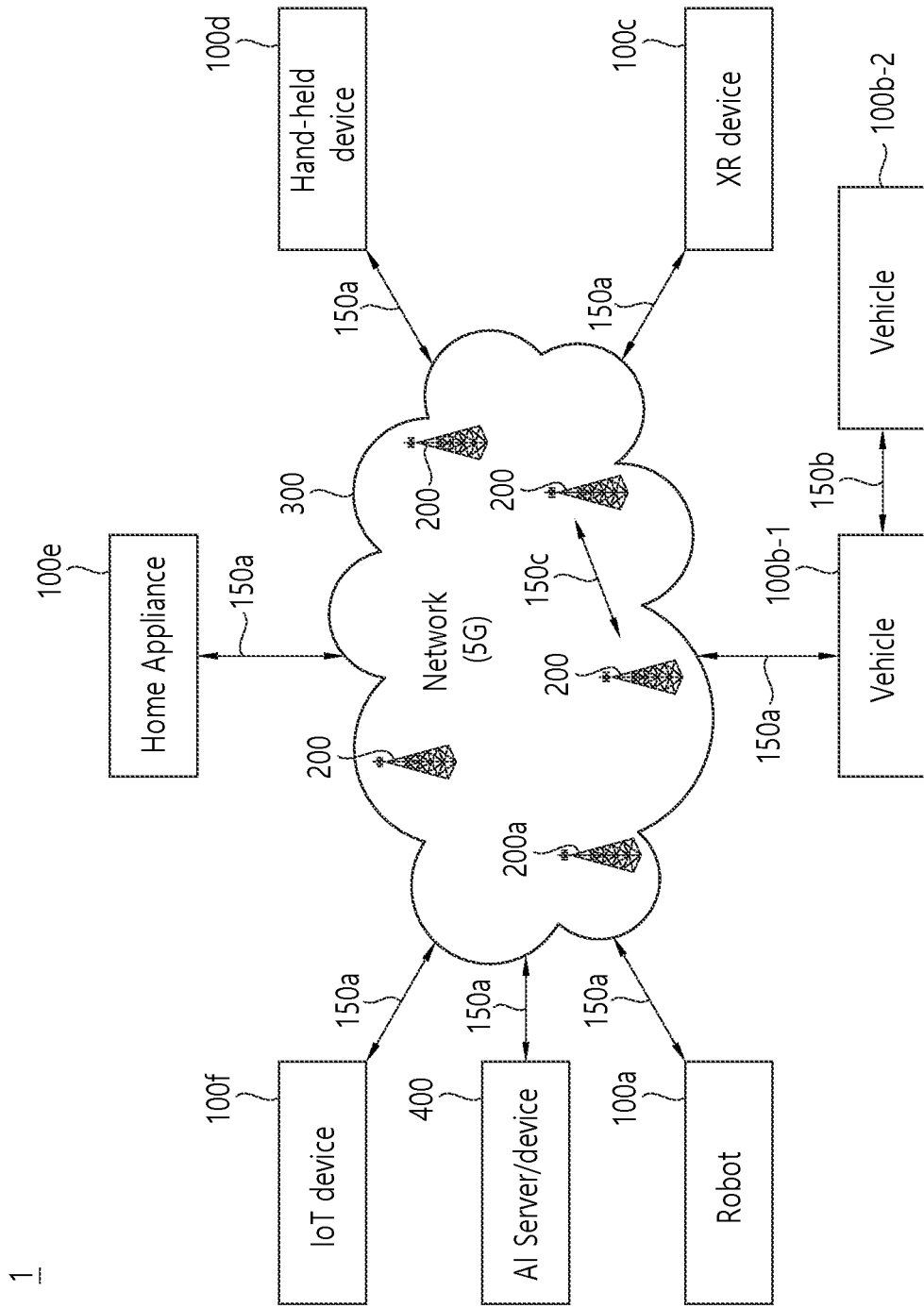
FIG. 15 illustrates a communication system 1 applied to the disclosure.

FIG. 15 illustrates a communication system 1 applied to the disclosure.

Referring to FIG. 15, the communication system 1 applied to the disclosure includes a wireless device, a base station, and a network. Here, the wireless device refers to a device that performs communication using a radio access technology (e.g., 5G new RAT (NR) or Long-Term Evolution (LTE)) and may be referred to as a communication/wireless/5G device. The wireless device may include, but limited to, a robot 100a, a vehicle 100b-1 and 100b-2, an extended reality (XR) device 100c, a hand-held device 100d, a home appliance 100e, an Internet of things (IoT) device 100f, and an AI device/server 400. For example, the vehicle may include a vehicle having a wireless communication function, an autonomous driving vehicle, a vehicle capable of inter-vehicle communication, or the like. Here, the vehicle may include an unmanned aerial vehicle (UAV) (e.g., a drone). The XR device may include augmented reality (AR)/virtual reality (VR)/mixed reality (MR) devices and may be configured as a head-mounted device (HMD), a vehicular head-up display (HUD), a television, a smartphone, a computer, a wearable device, a home appliance, digital signage, a vehicle, a robot, or the like. The hand-held device may include a smartphone, a smartpad, a wearable device (e.g., a smart watch or smart glasses), and a computer (e.g., a notebook). The home appliance may include a TV, a refrigerator, a washing machine, and the like. The IoT device may include a sensor, a smart meter, and the like. The base station and the network may be configured, for example, as wireless devices, and a specific wireless device 200a may operate as a base station/network node for other wireless devices.

The wireless devices 100a to 100f may be connected to the network 300 through the base station 200. Artificial intelligence (AI) technology may be applied to the wireless devices 100a to 100f, and the wireless devices 100a to 100f may be connected to an AI server 400 through the network 300. The network 300 may be configured using a 3G network, a 4G (e.g., LTE) network, or a 5G (e.g., NR) network. The wireless devices 100a to 100f may communicate with each other via the base station 200/network 300 and may also perform direct communication (e.g. sidelink communication) with each other without passing through the base station/network. For example, the vehicles 100b-1 and 100b-2 may perform direct communication (e.g. vehicle-to-vehicle (V2V)/vehicle-to-everything (V2X) communication). Further, the IoT device (e.g., a sensor) may directly communicate with another IoT device (e.g., a sensor) or another wireless device 100a to 100f.

Wireless communications/connections 150a, 150b, and 150c may be established between the wireless devices 100a to 100f and the base station 200 and between the base stations 200. Here, the wireless communications/connections may be established by various wireless access technologies (e.g., 5G NR), such as uplink/downlink communication 150a, sidelink communication 150b (or D2D communication), and inter-base station communication 150c (e.g., relay or integrated access backhaul (IAB)). The wireless devices and the base station/wireless devices, and the base stations may transmit/receive radio signals to/from each other through the wireless communications/connections 150a, 150b, and 150c. For example, the wireless communications/connections 150a, 150b, and 150c may transmit/receive signals over various physical channels. To this end, at least some of various configuration information setting processes, various signal processing processes (e.g., channel encoding/decoding, modulation/demodulation, resource mapping/demapping, and the like), and resource allocation processes may be performed on the basis of various proposals of the disclosure.

NR supports a plurality of numerologies (or a plurality of ranges of subcarrier spacing (SCS)) in order to support a variety of 5G services. For example, when SCS is 15 kHz, a wide area in traditional cellular bands is supported; when SCS is 30 kHz/60 kHz, a dense-urban, lower-latency, and wider-carrier bandwidth is supported; when SCS is 60 kHz or higher, a bandwidth greater than 24.25 GHz is supported to overcome phase noise.

NR frequency bands may be defined as frequency ranges of two types (FR1 and FR2). The values of the frequency ranges may be changed. For example, the frequency ranges of the two types (FR1 and FR2) may be as shown in Table 4. For convenience of description, FR1 of the frequency ranges used for an NR system may refer to a "sub 6 GHz range", and FR2 may refer to an "above 6 GHz range" and may be referred to as a millimeter wave (mmW).

TABLE 1

| Frequency range designation | Corresponding frequency range | Subcarrier spacing |
| --- | --- | --- |
| FR1 | 450 MHz-6000 MHz | 15, 30, 60 kHz |
| FR2 | 24250 MHz-52600 MHz | 60, 120, 240 kHz |

As illustrated above, the values of the frequency ranges for the NR system may be changed. For example, FR1 may include a band from 410 MHz to 7125 MHz as shown in Table 5. That is, FR1 may include a frequency band of 6 GHz (or 5850, 5900, 5925 MHz, or the like) or greater. For example, the frequency band of 6 GHz (or 5850, 5900, 5925 MHz, or the like) or greater included in FR1 may include an unlicensed band. The unlicensed bands may be used for a variety of purposes, for example, for vehicular communication (e.g., autonomous driving).

TABLE 2

| Frequency range designation | Corresponding frequency range | Subcarrier spacing |
| --- | --- | --- |
| FR1 | 410 MHz-7125 MHz | 15, 30, 60 kHz |
| FR2 | 24250 MHz-52600 MHz | 60, 120, 240 kHz |

Figure 16:
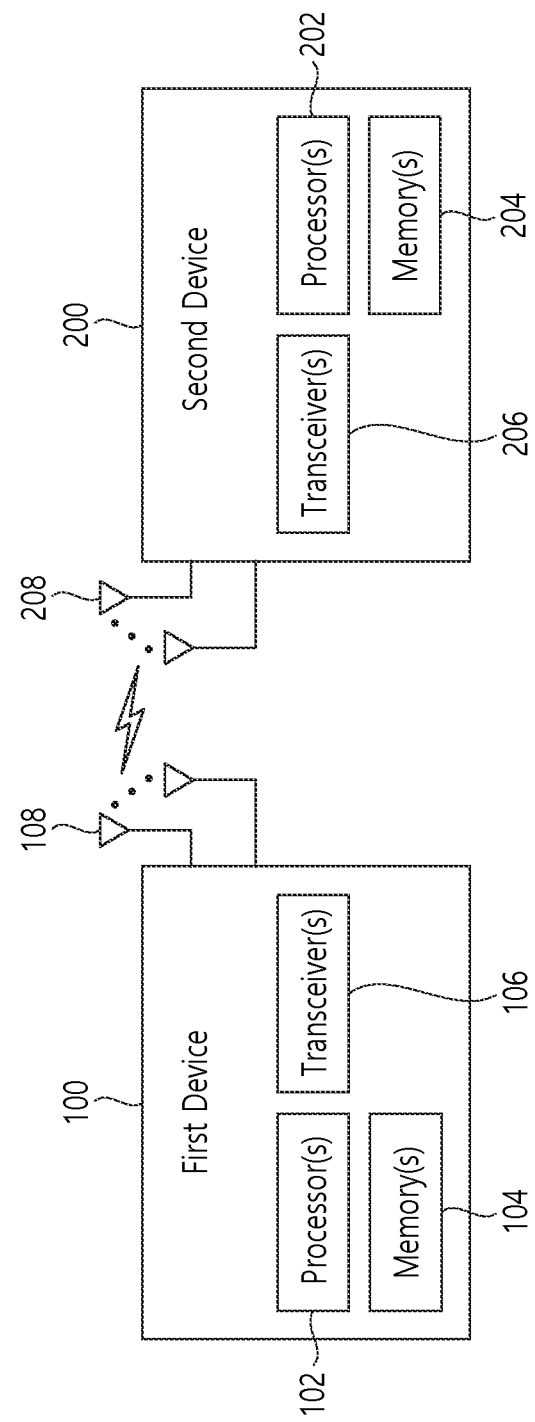
FIG. 16 illustrates a wireless device that is applicable to the disclosure.

FIG. 16 illustrates a wireless device that is applicable to the disclosure.

Referring to FIG. 16, a first wireless device 100 and a second wireless device 200 may transmit and receive radio signals through various radio access technologies (e.g., LTE and NR). Here, the first wireless device 100 and the second wireless device 200 may respectively correspond to a wireless device 100x and the base station 200 of FIG. 15 and/or may respectively correspond to a wireless device 100x and a wireless device 100x of FIG. 15.

The first wireless device 100 includes at least one processor 102 and at least one memory 104 and may further include at least one transceiver 106 and/or at least one antenna 108. The processor 102 may be configured to control the memory 104 and/or the transceiver 106 and to implement the descriptions, functions, procedures, proposals, methods, and/or operational flowcharts disclosed herein. For example, the processor 102 may process information in the memory 104 to generate first information/signal and may then transmit a radio signal including the first information/signal through the transceiver 106. In addition, the processor 102 may receive a radio signal including second information/signal through the transceiver 106 and may store information obtained from signal processing of the second information/signal in the memory 104. The memory 104 may be connected to the processor 102 and may store various pieces of information related to the operation of the processor 102. For example, the memory 104 may store a software code including instructions to perform some or all of processes controlled by the processor 102 or to perform the descriptions, functions, procedures, proposals, methods, and/or operational flowcharts disclosed herein. Here, the processor 102 and the memory 104 may be part of a communication modem/circuit/chip designed to implement a radio communication technology (e.g., LTE or NR). The transceiver 106 may be connected with the processor 102 and may transmit and/or receive a radio signal via the at least one antennas 108. The transceiver 106 may include a transmitter and/or a receiver. The transceiver 106 may be replaced with a radio frequency (RF) unit. In the disclosure, the wireless device may refer to a communication modem/circuit/chip.

The second wireless device 200 includes at least one processor 202 and at least one memory 204 and may further include at least one transceiver 206 and/or at least one antenna 208. The processor 202 may be configured to control the memory 204 and/or the transceiver 206 and to implement the descriptions, functions, procedures, proposals, methods, and/or operational flowcharts disclosed herein. For example, the processor 202 may process information in the memory 204 to generate third information/signal and may then transmit a radio signal including the third information/signal through the transceiver 206. In addition, the processor 202 may receive a radio signal including fourth information/signal through the transceiver 206 and may store information obtained from signal processing of the fourth information/signal in the memory 204. The memory 204 may be connected to the processor 202 and may store various pieces of information related to the operation of the processor 202. For example, the memory 204 may store a software code including instructions to perform some or all of processes controlled by the processor 202 or to perform the descriptions, functions, procedures, proposals, methods, and/or operational flowcharts disclosed herein. Here, the processor 202 and the memory 204 may be part of a communication modem/circuit/chip designed to implement a radio communication technology (e.g., LTE or NR). The transceiver 206 may be connected with the processor 202 and may transmit and/or receive a radio signal via the at least one antennas 208. The transceiver 206 may include a transmitter and/or a receiver. The transceiver 206 may be replaced with an RF unit. In the disclosure, the wireless device may refer to a communication modem/circuit/chip.

Hereinafter, hardware elements of the wireless devices 100 and 200 are described in detail. At least one protocol layer may be implemented, but limited to, by the at least one processor 102 and 202. For example, the at least one processor 102 and 202 may implement at least one layer (e.g., a functional layer, such as PHY, MAC, RLC, PDCP, RRC, and SDAP layers). The at least one processor 102 and 202 may generate at least one protocol data unit (PDU) and/or at least one service data unit (SDU) according to the descriptions, functions, procedures, proposals, methods, and/or operational flowcharts disclosed herein. The at least one processor 102 and 202 may generate a message, control information, data, or information according to the descriptions, functions, procedures, proposals, methods, and/or operational flowcharts disclosed herein. The at least one processor 102 and 202 may generate a signal (e.g., a baseband signal) including a PDU, an SDU, a message, control information, data, or information according to the functions, procedures, proposals, and/or methods disclosed herein and may provide the signal to the at least one transceiver 106 and 206. The at least one processor 102 and 202 may receive a signal (e.g., a baseband signal) from the at least one transceiver 106 and 206 and may obtain a PDU, an SDU, a message, control information, data, or information according to the descriptions, functions, procedures, proposals, methods, and/or operational flowcharts disclosed herein.

The at least one processor 102 and 202 may be referred to as a controller, a microcontroller, a microprocessor, or a microcomputer. The at least one processor 102 and 202 may be implemented by hardware, firmware, software, or a combination thereof. For example, at least one application-specific integrated circuit (ASIC), at least one digital signal processor (DSP), at least one digital signal processing devices (DSPD), at least one programmable logic devices (PLD), or at least one field programmable gate array (FPGA) may be included in the at least one processor 102 and 202. The descriptions, functions, procedures, proposals, methods, and/or operational flowcharts disclosed herein may be implemented using firmware or software, and the firmware or software may be configured to include modules, procedures, functions, and the like. The firmware or software configured to perform the descriptions, functions, procedures, proposals, methods, and/or operational flowcharts disclosed herein may be included in the at least one processor 102 and 202 or may be stored in the at least one memory 104 and 204 and may be executed by the at least one processor 102 and 202. The descriptions, functions, procedures, proposals, methods, and/or operational flowcharts disclosed herein may be implemented in the form of a code, an instruction, and/or a set of instructions using firmware or software.

The at least one memory 104 and 204 may be connected to the at least one processor 102 and 202 and may store various forms of data, signals, messages, information, programs, codes, indications, and/or commands. The at least one memory 104 and 204 may be configured as a ROM, a RAM, an EPROM, a flash memory, a hard drive, a register, a cache memory, a computer-readable storage medium, and/or a combinations thereof. The at least one memory 104 and 204 may be disposed inside and/or outside the at least one processor 102 and 202. In addition, the at least one memory 104 and 204 may be connected to the at least one processor 102 and 202 through various techniques, such as a wired or wireless connection.

The at least one transceiver 106 and 206 may transmit user data, control information, a radio signal/channel, or the like mentioned in the methods and/or operational flowcharts disclosed herein to at least different device. The at least one transceiver 106 and 206 may receive user data, control information, a radio signal/channel, or the like mentioned in the descriptions, functions, procedures, proposals, methods, and/or operational flowcharts disclosed herein from at least one different device. For example, the at least one transceiver 106 and 206 may be connected to the at least one processor 102 and 202 and may transmit and receive a radio signal. For example, the at least one processor 102 and 202 may control the at least one transceiver 106 and 206 to transmit user data, control information, or a radio signal to at least one different device. In addition, the at least one processor 102 and 202 may control the at least one transceiver 106 and 206 to receive user data, control information, or a radio signal from at least one different device. The at least one transceiver 106 and 206 may be connected to the at least one antenna 108 and 208 and may be configured to transmit or receive user data, control information, a radio signal/channel, or the like mentioned in the descriptions, functions, procedures, proposals, methods, and/or operational flowcharts disclosed herein through the at least one antenna 108 and 208. In this document, the at least one antenna may be a plurality of physical antennas or may be a plurality of logical antennas (e.g., antenna ports). The at least one transceiver 106 and 206 may convert a received radio signal/channel from an RF band signal into a baseband signal in order to process received user data, control information, a radio signal/channel, or the like using the at least one processor 102 and 202. The at least one transceiver 106 and 206 may convert user data, control information, a radio signal/channel, or the like, processed using the at least one processor 102 and 202, from a baseband signal to an RF bad signal. To this end, the at least one transceiver 106 and 206 may include an (analog) oscillator and/or a filter.

Figure 17:
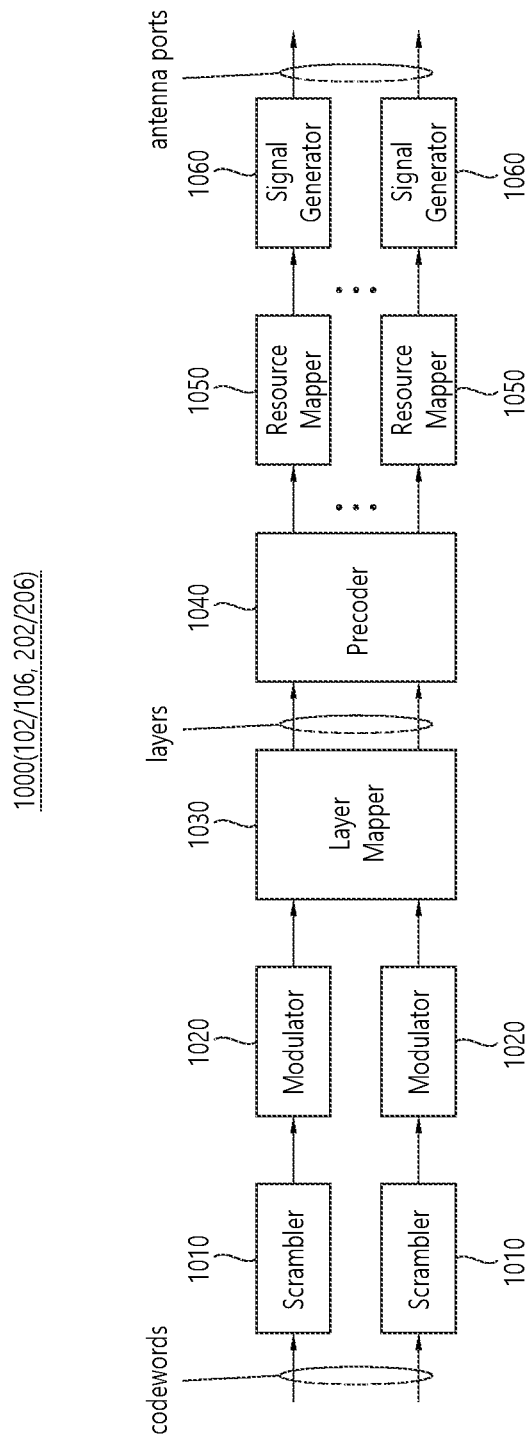
FIG. 17 illustrates a signal processing circuit for a transmission signal.

FIG. 17 illustrates a signal processing circuit for a transmission signal.

Referring to FIG. 17, the signal processing circuit 1000 may include a scrambler 1010, a modulator 1020, a layer mapper 1030, a precoder 1040, a resource mapper 1050, and a signal generator 1060. Operations/functions illustrated with reference to FIG. 17 may be performed, but not limited to, in the processor 102 and 202 and/or the transceiver 106 and 206 of FIG. 16. Hardware elements illustrated in FIG. 17 may be configured in the processor 102 and 202 and/or the transceiver 106 and 206 of FIG. 16. For example, blocks 1010 to 1060 may be configured in the processor 102 and 202 of FIG. 16. Alternatively, blocks 1010 to 1050 may be configured in the processor 102 and 202 of FIG. 16, and a block 1060 may be configured in the transceiver 106 and 206 of FIG. 16.

A codeword may be converted into a radio signal via the signal processing circuit 1000 of FIG. 17. Here, the codeword is an encoded bit sequence of an information block. The information block may include a transport block (e.g., a UL-SCH transport block and a DL-SCH transport block). The radio signal may be transmitted through various physical channels (e.g., a PUSCH or a PDSCH).

Specifically, the codeword may be converted into a scrambled bit sequence by the scrambler 1010. A scrambled sequence used for scrambling is generated on the basis of an initialization value, and the initialization value may include ID information about a wireless device. The scrambled bit sequence may be modulated into a modulation symbol sequence by the modulator 1020. A modulation scheme may include pi/2-binary phase shift keying (pi/2-BPSK), m-phase shift keying (m-PSK), m-quadrature amplitude modulation (m-QAM), and the like. A complex modulation symbol sequence may be mapped to at least one transport layer by the layer mapper 1030. Modulation symbols of each transport layer may be mapped to a corresponding antenna port(s) by the precoder 1040 (precoding). Output z from the precoder 1040 may be obtained by multiplying output y from the layer mapper 1030 by a precoding matrix W of N*M, where N is the number of antenna ports, and M is the number of transport layers. Here, the precoder 1040 may perform precoding after performing transform precoding (e.g., DFT transform) on complex modulation symbols. Alternatively, the precoder 1040 may perform precoding without performing transform precoding.

The resource mapper 1050 may map a modulation symbol of each antenna port to a time-frequency resource. The time-frequency resource may include a plurality of symbols (e.g., CP-OFDMA symbols or DFT-s-OFDMA symbols) in the time domain and may include a plurality of subcarriers in the frequency domain. The signal generator 1060 may generate a radio signal from mapped modulation symbols, and the generated radio signal may be transmitted to another device through each antenna. To this end, the signal generator 1060 may include an inverse fast Fourier transform (IFFT) module, a cyclic prefix (CP) inserter, a digital-to-analog converter (DAC), a frequency upconverter, and the like.

A signal processing procedure for a received signal in a wireless device may be performed in the reverse order of the signal processing procedure 1010 to 1060 of FIG. 17. For example, a wireless device (e.g., 100 and 200 of FIG. 16) may receive a radio signal from the outside through an antenna port/transceiver. The received radio signal may be converted into a baseband signal through a signal reconstructor. To this end, the signal reconstructor may include a frequency downconverter, an analog-to-digital converter (ADC), a CP remover, and a fast Fourier transform (FFT) module. The baseband signal may be reconstructed to a codeword through resource demapping, postcoding, demodulation, and descrambling. The codeword may be reconstructed to an original information block through decoding. Thus, a signal processing circuit (not shown) for a received signal may include a signal reconstructor, a resource demapper, a postcoder, a demodulator, a descrambler and a decoder.

Figure 18:
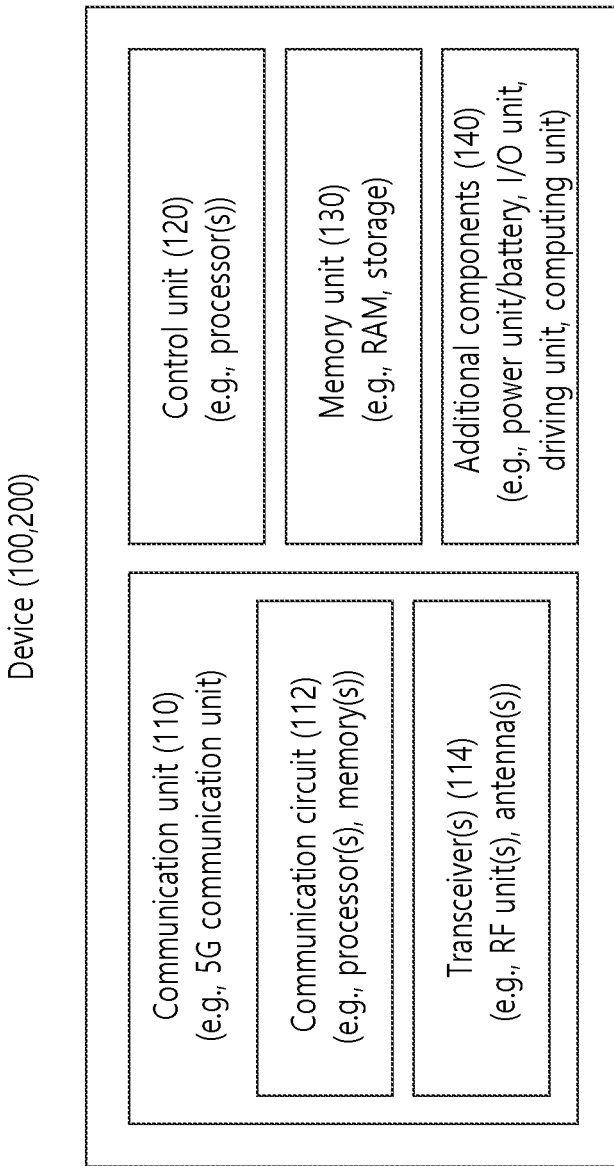
FIG. 18 illustrates another example of a wireless device applied to the disclosure.

FIG. 18 illustrates another example of a wireless device applied to the disclosure. The wireless device may be configured in various forms depending on usage/service. (See FIG. 15)

Referring to FIG. 18, the wireless devices 100 and 200 may correspond to the wireless device 100 and 200 of FIG. 16 and may include various elements, components, units, and/or modules. For example, the wireless device 100 and 200 may include a communication unit 110, a control unit 120, a memory unit 130, and additional components 140. The communication unit may include a communication circuit 112 and a transceiver(s) 114. For example, the communication circuit 112 may include the at least one processor 102 and 202 and/or the at least one memory 104 and 204 of FIG. 16. For example, the transceiver(s) 114 may include the at least one transceiver 106 and 206 and/or the at least one antenna 108 and 208 of FIG. 16. The control unit 120 is electrically connected to the communication unit 110, the memory unit 130, and the additional components 140 and controls overall operations of the wireless device. For example, the control unit 120 may control electrical/mechanical operations of the wireless device on the basis of a program/code/command/information stored in the memory unit 130. In addition, the control unit 120 may transmit information stored in the memory unit 130 to the outside (e.g., a different communication device) through a wireless/wired interface via the communication unit 110 or may store, in the memory unit 130, information received from the outside (e.g., a different communication device) through the wireless/wired interface via the communication unit 110.

The additional components 140 may be configured variously depending on the type of the wireless device. For example, the additional components 140 may include at least one of a power unit/battery, an input/output (I/O) unit, a driving unit, and a computing unit. The wireless device may be configured, but not limited to, as a robot (100*a* in FIG. 15), a vehicle (100 *b*-1 or 100 *b*-2 in FIG. 15), an XR device (100 *c* in FIG. 15), a hand-held device (100 *d* in FIG. 15), a home appliance (100*e* in FIG. 15), an IoT device (100*f* in FIG. 15), a terminal for digital broadcasting, a hologram device, a public safety device, an MTC device, a medical device, a fintech device (or financial device), a security device, a climate/environmental device, an AI server/device (400 in FIG. 15), a base station (200 in FIG. 15), a network node, or the like. The wireless device may be mobile or may be used in a fixed place depending on usage/service.

In FIG. 18, all of the various elements, components, units, and/or modules in the wireless devices 100 and 200 may be connected to each other through a wired interface, or at least some thereof may be wirelessly connected through the communication unit 110. For example, the control unit 120 and the communication unit 110 may be connected via a cable in the wireless device 100 and 200, and the control unit 120 and a first unit (e.g., 130 and 140) may be wirelessly connected through the communication unit 110. In addition, each element, component, unit, and/or module in wireless device 100 and 200 may further include at least one element. For example, the control unit 120 may include at least one processor set. For example, the control unit 120 may be configured as a set of a communication control processor, an application processor, an electronic control unit (ECU), a graphics processing processor, a memory control processor, and the like. In another example, the memory unit 130 may include a random-access memory (RAM), a dynamic RAM (DRAM), a read-only memory (ROM), a flash memory, a volatile memory, a non-volatile memory, and/or a combination thereof.

Next, an illustrative configuration of FIG. 18 is described in detail with reference to the accompanying drawing.

Figure 19:
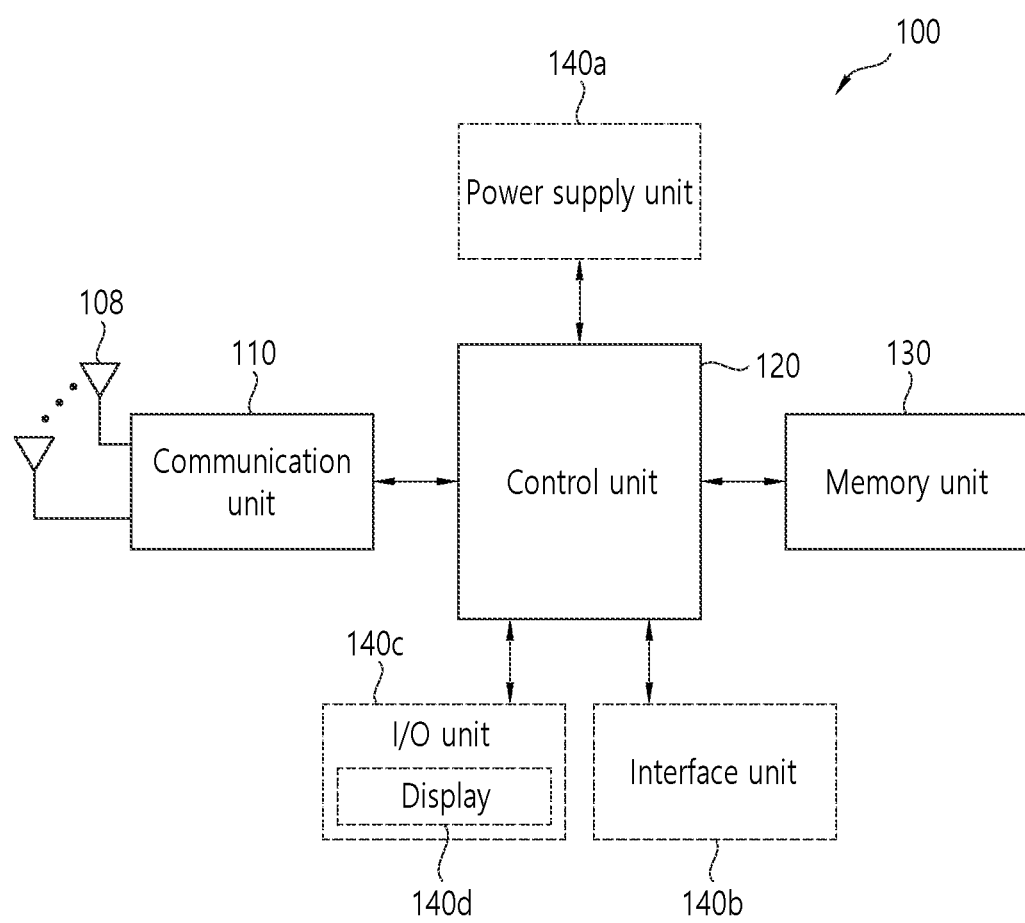
FIG. 19 illustrates a hand-held device applied to the disclosure.

FIG. 19 illustrates a hand-held device applied to the disclosure. The hand-held device may include a smartphone, a smartpad, a wearable device (e.g., a smart watch or smart glasses), and a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 19, the hand-held device 100 may include an antenna unit 108, a communication unit 110, a control unit 120, a memory unit 130, a power supply unit 140*a*, an interface unit 140*b*, and an input/output unit 140*c*. The antenna unit 108 may be configured as a part of the communication unit 110. Blocks 110 to 130/140*a* to 140*c* correspond to the blocks 110 to 130/140 in FIG. 18, respectively.

The communication unit 110 may transmit and receive a signal (e.g., data, a control signal, or the like) to and from other wireless devices and base stations. The control unit 120 may control various components of the hand-held device 100 to perform various operations. The control unit 120 may include an application processor (AP). The memory unit 130 may store data/parameter/program/code/command necessary to drive the hand-held device 100. Further, the memory unit 130 may store input/output data/information. The power supply unit 140*a* supplies power to the hand-held device 100 and may include a wired/wireless charging circuit, a battery, and the like. The interface unit 140*b* may support a connection between the hand-held device 100 and a different external device. The interface unit 140*b* may include various ports (e.g., an audio input/output port and a video input/output port) for connection to an external device. The input/output unit 140*c* may receive or output image information/signal, audio information/signal, data, and/or information input from a user. The input/output unit 140*c* may include a camera, a microphone, a user input unit, a display unit 140*d*, a speaker, and/or a haptic module.

For example, in data communication, the input/output unit 140*c* may obtain information/signal (e.g., a touch, text, voice, an image, and a video) input from the user, and the obtained information/signal may be stored in the memory unit 130. The communication unit 110 may convert information/signal stored in the memory unit into a radio signal and may transmit the converted radio signal directly to a different wireless device or to a base station. In addition, the communication unit 110 may receive a radio signal from a different wireless device or the base station and may reconstruct the received radio signal to original information/signal. The reconstructed information/signal may be stored in the memory unit 130 and may then be output in various forms (e.g., text, voice, an image, a video, and a haptic form) through the input/output unit 140*c*.

Figure 20:
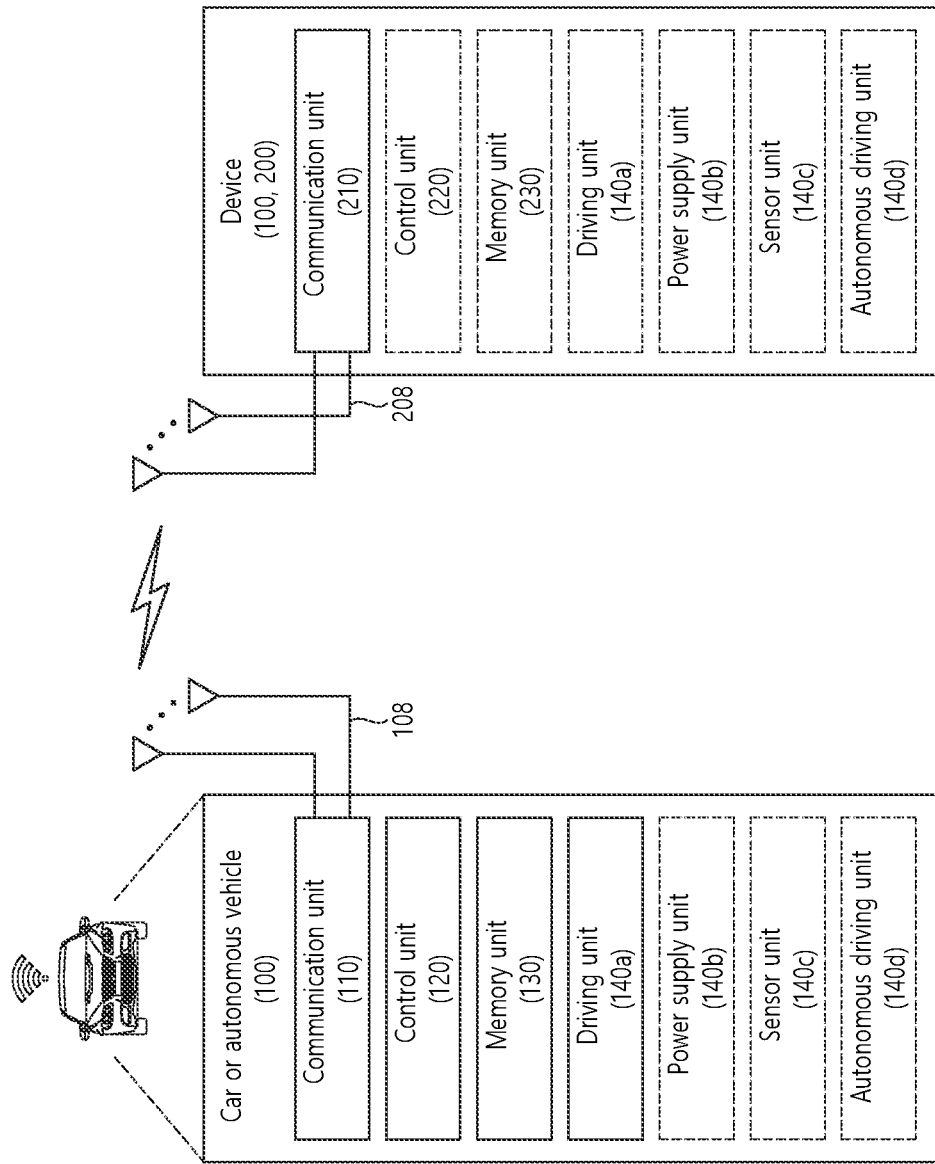
FIG. 20 illustrates a vehicle or an autonomous driving vehicle applied to the disclosure.

FIG. 20 illustrates a vehicle or an autonomous driving vehicle applied to the disclosure. The vehicle or the autonomous driving may be configured as a mobile robot, a car, a train, a manned/unmanned aerial vehicle (AV), a ship, or the like.

Referring to FIG. 20, the vehicle or the autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. Blocks 110/130/140*a* to 140*d* correspond to the blocks 110/130/140 in FIG. 18, respectively.

The communication unit 110 may transmit and receive a signal (e.g., data, a control signal, or the like) to and from external devices, such as a different vehicle, a base station (e.g. a base station, a road-side unit, or the like), and a server. The control unit 120 may control elements of the vehicle or the autonomous driving vehicle 100 to perform various operations. The control unit 120 may include an electronic control unit (ECU). The driving unit 140*a* may enable the vehicle or the autonomous driving vehicle 100 to run on the ground. The driving unit 140*a* may include an engine, a motor, a power train, wheels, a brake, a steering device, and the like. The power supply unit 140*b* supplies power to the vehicle or the autonomous driving vehicle 100 and may include a wired/wireless charging circuit, a battery, and the like. The sensor unit 140*c* may obtain a vehicle condition, environmental information, user information, and the like. The sensor unit 140*c* may include an inertial measurement unit (IMU) sensor, a collision sensor, a wheel sensor, a speed sensor, an inclination sensor, a weight sensor, a heading sensor, a position module, vehicular forward/backward vision sensors, a battery sensor, a fuel sensor, a tire sensor, a steering sensor, a temperature sensor, a humidity sensor, an ultrasonic sensor, an illuminance sensor, a pedal position sensor, and the like. The autonomous driving unit 140d may implement a technology for maintaining a driving lane, a technology for automatically adjusting speed, such as adaptive cruise control, a technology for automatic driving along a set route, a technology for automatically setting a route and driving when a destination is set, and the like.

For example, the communication unit 110 may receive map data, traffic condition data, and the like from an external server. The autonomous driving unit 140d may generate an autonomous driving route and a driving plan on the basis of obtained data. The control unit 120 may control the driving unit 140a to move the vehicle or the autonomous driving vehicle 100 along the autonomous driving route according to the driving plan (e.g., speed/direction control). During autonomous driving, the communication unit 110 may aperiodically/periodically obtain updated traffic condition data from the external server and may obtain surrounding traffic condition data from a neighboring vehicle. Further, during autonomous driving, the sensor unit 140c may obtain a vehicle condition and environmental information. The autonomous driving unit 140d may update the autonomous driving route and the driving plan on the basis of newly obtained data/information. The communication unit 110 may transmit information about a vehicle location, an autonomous driving route, a driving plan, and the like to the external server. The external server may predict traffic condition data in advance using AI technology or the like on the basis of information collected from vehicles or autonomous driving vehicles and may provide the predicted traffic condition data to the vehicles or the autonomous driving vehicles.

What is claimed is:

1. A resource selecting method of a sidelink terminal in a wireless communication system, the resource selecting method comprising:
    determining resource selection sub-windows in a resource selection window based on a repeated transmission number for a sidelink message; and
    selecting resource for transmitting the sidelink message within each of the resource selection sub-window,
    wherein the repeated transmission number includes the number of initial transmission and retransmission for the sidelink message.

2. The resource selecting method of claim 1, wherein a size of the resource selection sub-window for retransmission is determined as a largest integer less than a value obtained by dividing the size of the resource selection window by the repeated transmission number.

3. The resource selecting method of claim 2, wherein the size of the resource selection sub-window for the initial transmission is determined as a value obtained by subtracting a value obtained by multiplying the retransmission number by the size of the resource selection sub-window from the resource selection window.

4. The resource selecting method of claim 1, wherein the repeated transmission number is determined based on at least one of capability of the terminal and a receiving terminal receiving the sidelink message and a requirement for the sidelink message.

5. The resource selecting method of claim 4, wherein the requirement is related to latency or reliability.

6. The resource selecting method of claim 4, wherein the terminal receives information on the capability of the receiving terminal from the receiving terminal.

7. The resource selecting method of claim 4, wherein the capability includes hybrid automatic repeat request (HARQ) round trip time (RTT) related processing capability of the terminal and the receiving terminal.

8. The resource selecting method of claim 7, wherein the capability is a relatively lower value among the HARQ RTT related processing capabilities of the respective terminal and the receiving terminal.

9. The resource selecting method of claim 4, wherein the terminal determines a number of resource selection sub-windows corresponding to the maximum repeated transmission available number when the maximum repeated transmission available number based on the capability is greater than a required repeated transmission number required for the requirement, and the terminal selects the resource within the number of resource selection sub-windows corresponding to the required repeated transmission number.

10. The resource selecting method of claim 9, wherein the terminal selects the resource within the number of resource selection sub-windows corresponding to the required repeated transmission number in earliest order on a time axis.

11. The resource selecting method of claim 4, wherein the terminal determines a number of resource selection sub-windows corresponding to the maximum repeated transmission available number when the maximum repeated transmission available number based on the capability is less than the required repeated transmission number required for the requirement, and the terminal selects the resource within the determined resource selection sub-windows.

12. The resource selecting method of claim 1, wherein the repeated transmission number is determined by a plurality of sidelink message transmission per resource selection subframe and a unit of a HARQ feedback for the transmission.

13. The resource selecting method of claim 1, wherein the terminal selects resource for the sidelink message transmission within each of the resource selection sub-windows excluding the last resource selection sub-window on the time axis.

14. The resource selecting method of claim 1, wherein the terminal selects the resource within each of the resource selection sub-windows including resource at a specific ratio or higher, and the specific ratio is a ratio of resource whose reference signal received power (RSRP) is equal to or lower than a threshold value among resources included in each of the resource selection sub-windows.

15. The resource selecting method of claim 14, wherein the specific ratio related to the resource selection sub-window for the initial transmission and the specific ratio related to the resource selection sub-window for the retransmission are different from each other.

16. The resource selecting method of claim 1, wherein the repeated transmission number relates to an HARQ feedback information transmission number of a receiving terminal receiving the sidelink message.

17. A user equipment (UE) comprising:
    a transceiver configured to transmit and receive a wireless signal; and
    a processor operably coupled to the transceiver,
    wherein the processor is configured
    to determine resource selection sub-windows in a resource selection window based on a repeated transmission number for a sidelink message and to select resource for transmitting the sidelink message within each of the resource selection sub-window, wherein the repeated transmission number includes the number of initial transmission and retransmission for the sidelink message.

18. The UE of claim 17, wherein the UE may be a terminal which communicates with at least one of a mobile terminal, a network, or an autonomous driving vehicle other than the terminal.

* * * * *